United States Patent
Park et al.

(10) Patent No.: US 12,484,075 B2
(45) Date of Patent: Nov. 25, 2025

(54) DETERMINING PERIODICITY OF SIDELINK COMMUNICATIONS WITHIN THE NETWORK COVERAGE

(71) Applicant: SHARP KABUSHIKI KAISHA, Osaka (JP)

(72) Inventors: Kenneth James Park, Vancouver, WA (US); Kazunari Yokomakura, Sakai (JP); Zhanping Yin, Vancouver, WA (US); John Michael Kowalski, Vancouver, WA (US)

(73) Assignee: SHARP KABUSHIKI KAISHA, Sakai (JP)

( * ) Notice: Subject to any disclaimer, the term of this patent is extended or adjusted under 35 U.S.C. 154(b) by 283 days.

(21) Appl. No.: 18/273,628

(22) PCT Filed: Feb. 18, 2022

(86) PCT No.: PCT/JP2022/006532
§ 371 (c)(1),
(2) Date: Jul. 21, 2023

(87) PCT Pub. No.: WO2022/176973
PCT Pub. Date: Aug. 25, 2022

(65) Prior Publication Data
US 2024/0107557 A1    Mar. 28, 2024

Related U.S. Application Data

(60) Provisional application No. 63/151,606, filed on Feb. 19, 2021.

(51) Int. Cl.
*H04W 72/25*  (2023.01)
*H04W 76/10*  (2018.01)
*H04W 76/28*  (2018.01)

(52) U.S. Cl.
CPC ......... *H04W 72/25* (2023.01); *H04W 76/10* (2018.02); *H04W 76/28* (2018.02)

(58) Field of Classification Search
CPC ..... H04W 72/25; H04W 76/10; H04W 76/28; H04W 72/51; H04W 4/023; H04W 4/40; H04W 92/18
See application file for complete search history.

(56) References Cited

PUBLICATIONS

Xiaomi New Study on Ranging based Services (Year: 2020).*
(Continued)

*Primary Examiner* — Ayanah S George
(74) *Attorney, Agent, or Firm* — ScienBiziP, P.C.

(57) ABSTRACT

A method for a first UE to perform sidelink communication with a second UE is provided. The method receives a first resource set from a cell to establish a first sidelink channel with the second UE, the first resource set indicating at least a first distance between the first and second UEs. The method establishes the first sidelink channel with the second UE based on the first resource set and transmits a set of parameters associated with the first sidelink channel to the cell. The method also sets a first timer based on at least the first distance, the first timer for determining when to establish a second sidelink channel with the second UE. When the first timer is expired and no second resource set is received from the cell, the method establishes the second sidelink channel with the second UE based on the first resource set.

15 Claims, 15 Drawing Sheets

(56) References Cited

PUBLICATIONS

3GPP TS 38.331 V16.3.1 (Jan. 2021) 3rd Generation Partnership Project; Technical Specification Group Radio Access Network; NR; Radio Resource Control (RRC) protocol specification (Release 16).
3GPP TS 38.104 V15.1.0 (Mar. 2018) 3rd Generation Partnership Project; Technical Specification Group Radio Access Network; NR; Base Station (BS) radio transmission and reception (Release 15).
3GPP TS 38.101-2 V17.0.0 (Dec. 2020) 3rd Generation Partnership Project; Technical Specification Group Radio Access Network; NR; User Equipment (UE) radio transmission and reception; Part 2: Range 2 Standalone (Release 17).
3GPP TS 38.101-1 V17.0.0 (Dec. 2020) 3rd Generation Partnership Project; Technical Specification Group Radio Access Network; NR; User Equipment (UE) radio transmission and reception; Part 1: Range 1 Standalone (Release 17).
3GPP TS 23.287 V16.5.0 (Dec. 2020) 3rd Generation Partnership Project; Technical Specification Group Services and System Aspects; Architecture enhancements for 5G System (5GS) to support Vehicle-to-Everything (V2X) services (Release 16).
Xiaomi, "New Study on Ranging-based Services", S1-202304, 3GPP TSG-SA WG1 Meeting #90-e, E-meeting, May 18-22, 2020.
3GPP TR 22.885 V14.0.0 (Dec. 2015) 3rd Generation Partnership Project; Technical Specification Group Services and System Aspects; Study on LTE support for Vehicle to Everything (V2X) services (Release 14).

* cited by examiner

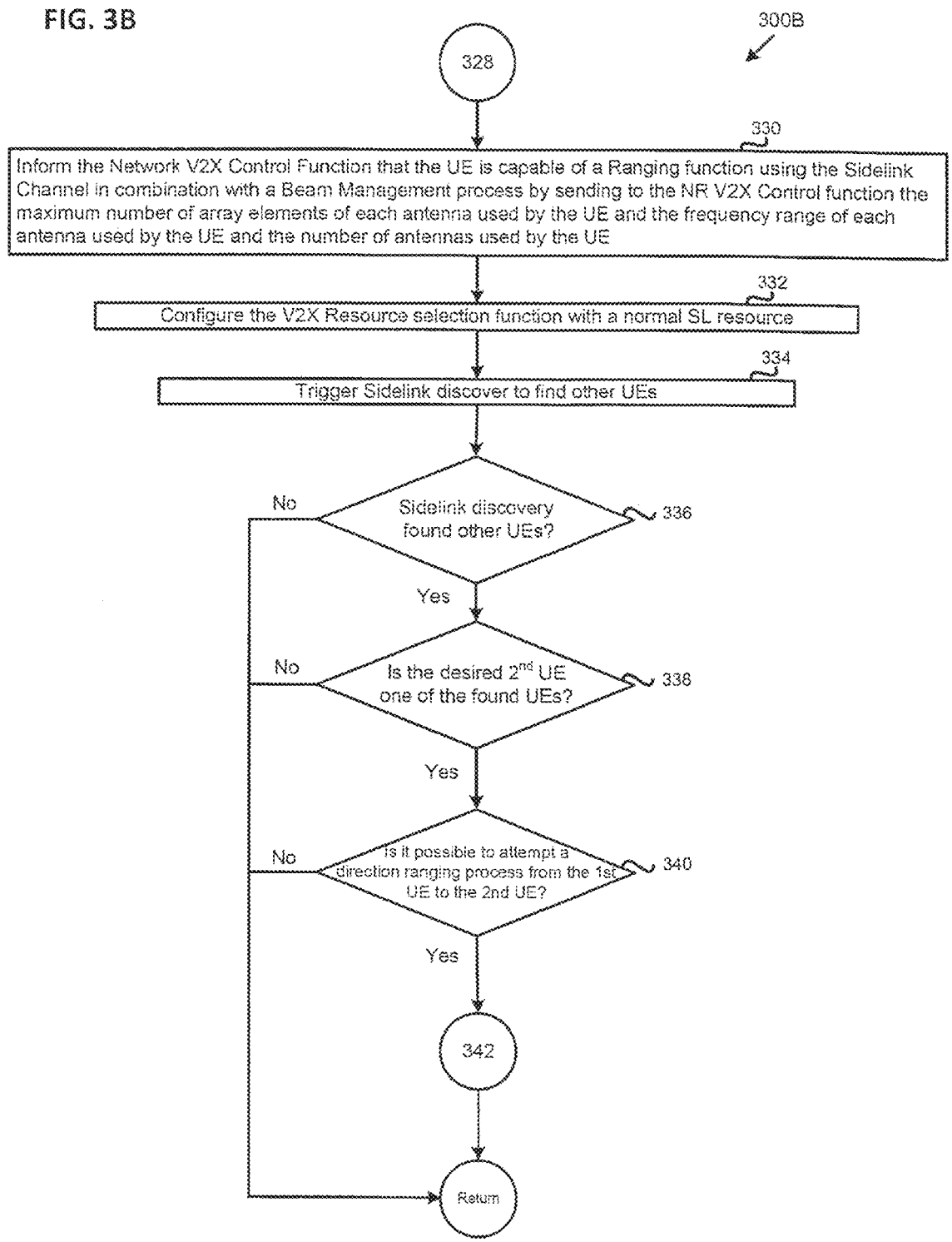

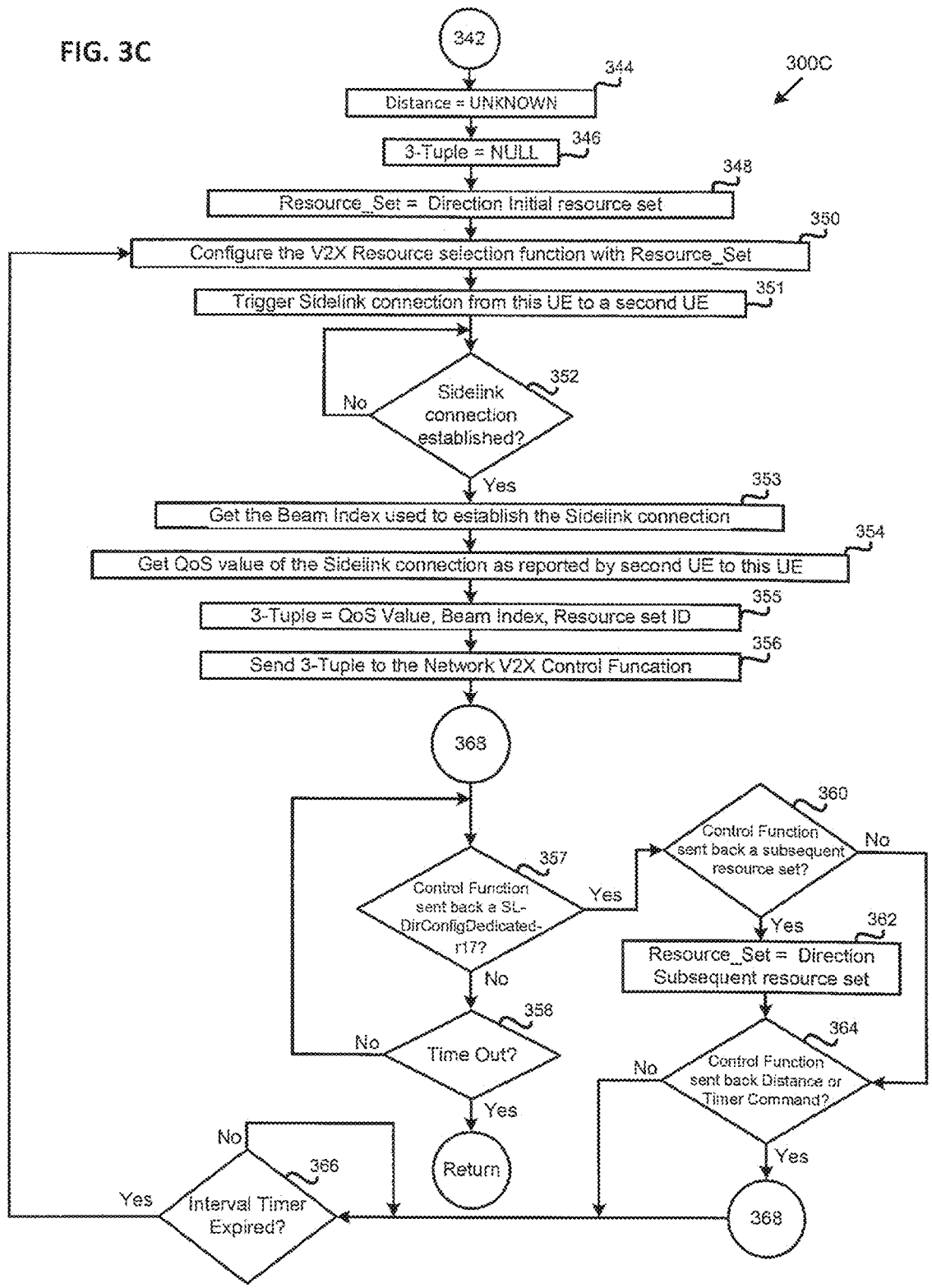

Resource set 1:
    Unique set identifier
    Parameters for configuring a NR V2X Resource Pool.
        SL-V2X-Config-NR
    Parameters for configuring a set of directional Tx beams,
        Number of Tx beams in the set (1...n)
        Beam width for each Tx beam of the set ([1,20deg], [2,20deg], [3,20deg],...,[n,Xdeg])
        Projection of each beam in the set ([1,Az,Alt],[2,Az,Alt],[3,Az, Alt],...,[n,Az,Alt])
    Parameters for Periodic direction determination
        Initial Interval (1..n)
        Interval Factor (0.0..1.0)
        Initial Distance (1..n)
        Distance Factor (0.0...1.0)
        Max_N_Factor (1..n)
        Timer_Command_Value (1..n)
        Distance (1..n)

Resource set 2:
    Unique set identifier
    Parameters for configuring a NR V2X Resource Pool.
        SL-V2X-Config-NR
    Parameters for configuring a set of directional Tx beams,
        Number of Tx beams in the set (1...m)
        Beam width for each Tx beam of the set ([1,10deg], [2,10deg], [3,10deg],...,[m,Xdeg])
        Projection of each beam in the set ([1,Az,Alt],[2,Az,Alt],[3,Az, Alt],...,[m,Az,Alt])
    Parameters for Periodic direction determination
        Initial Interval (1..n)
        Interval Factor (0.0..1.0)
        Initial Distance (1..n)
        Distance Factor (0.0...1.0)
        Max_N_Factor (1..n)
        Timer_Command_Value (1..n)
        Distance (1..n)

⁂

Resource set n:
    Unique set identifier
    Parameters for configuring a NR V2X Resource Pool.
        SL-V2X-Config-NR
    Parameters for configuring a set of directional Tx beams,
        Number of Tx beams in the set (1...q)
        Beam width for each Tx beam of the set ([1,10deg], [2,5deg], [3,5deg],...,[q,Xdeg])
        Projection of each beam in the set ([1,Az,Alt],[2,Az,Alt],[3,Az, Alt],...,[q,Az,Alt])
    Parameters for Periodic direction determination
        Initial Interval (1..n)
        Interval Factor (0.0..1.0)
        Initial Distance (1..n)
        Distance Factor (0.0...1.0)
        Max_N_Factor (1..n)
        Timer_Command_Value (1..n)
        Distance (1..n)

FIG. 4

UE Capability:
- Direction Determination Supported [Y, N]
- Antenna #1 parameters,
  - Frequency range of Antenna [ARFCN-low, ARFCN-hi]
  - Number of antenna array elements
  - Default orientation of the axis of the Tx antenna array in Horz Plane with respect to top of handset [xDeg]
  - Default orientation in Vert Plane to intersect Horz Plane[yDeg]
  - ....Other STUFF TBD
- Antenna #2 parameters,
  - Frequency range of Antenna [ARFCN-low, ARFCN-hi]
  - Number of antenna array elements
  - Default orientation of the axis of the Tx antenna array in Horz Plane with respect to top of handset [xDeg]
  - Default orientation in Vert Plane to intersect Horz Plane[yDeg]
  - ....Other STUFF TBD
- ........

FIG. 6

SIB12 message

```
-- ASN1START
-- TAG-SIB12-START
SIB12-r16 ::=            SEQUENCE {
    segmentNumber-r16        INTEGER (0..63),
    segmentType-r16          ENUMERATED {notLastSegment, lastSegment},
    segmentContainer-r16     OCTET STRING
}
SIB12-IEs-r16 ::=        SEQUENCE {
    sl-ConfigCommonNR-r16    SL-ConfigCommonNR-r16,
    ...
    criticalExtensions       CHOICE {
        sl-Direction-Not-Allowed     ENUMERATED {true, false}
        sl-DirConfigCommonNR-r17     SL-DirConfigCommonNR-r17,
        criticalExtensionsFuture     SEQUENCE {}
    },
    latexnonCriticalExtension    OCTET STRING                 OPTIONAL,
    ...
}

SL-DirConfigCommonNR-r17 ::=    SEQUENCE {
    sl-DirConfigID                      (1..SL-MaxDirConfiguration)
    sl-DirRangingCommonUE-r17           SEQUENCE {
        sl-Dir
        sl-CSI-RS-Config                sl-CSI-RS-Config-r17,
        sl-DirConfigCommonNR-r16        sl-DirConfigCommonNR-r16
    },
    sl-DirRangesUE-r17              CSI-ReportConfig
    Initial_Interval                INTEGER (1..maxInterval),
    Interval_Factor                 ENUMERATED {p00, p05, p10, p15, p20, p25, p30, p40, p50, p60, p70, p75, p80, p85, p90, p95},
    Initial_Distance                INTEGER (1..maxDistance)
    Distance_Factor                 ENUMERATED {p00, p05, p10, p15, p20, p25, p30, p40, p50, p60, p70, p75, p80, p85, p90, p95},
    Timer_Command_Value             INTEGER (1..maxInterval),
    Max_Num_Factor                  INTEGER (1..maxNumFactor)
},
SL-CSI-RS-Config-r17 ::=        SEQUENCE {
    sl-CSI-RS-ResourceSetList       CHOICE {
        sl-CSI-RS-SSB
        sl-CSI-RS-ResourceSetList       SEQUENCE (SIZE (1..maxNrofSL-CSI-RS-ResourceSetsPerConfig)) OF SL-CSI-RS-ResourceSet    OPTIONAL,     -- Need R
        sl-SSB-ResourceSetList          SEQUENCE (SIZE (1..maxNrofSL-SSB-ResourceSetsPerConfig)) OF SL-SSB-ResourceSet          OPTIONAL      -- Need R
    },
    ...
}
SL-CSI-RS-ResourceSet ::=       SEQUENCE {
    sl-CSI-RS-ResourceSetId         SL-CSI-RS-ResourceSetId,
    sl-CSI-RS-Resources             SEQUENCE (SIZE (1..maxNrofSL-CSI-RS-ResourcesPerSet)) OF SL-CSI-RS-Resources,
    repetition                      ENUMERATED { on, off }                                                                      OPTIONAL,     -- Need S
    ...
}
SL-CSI-RS-Resources ::=         SEQUENCE {
    SL-CSI-RS-ResourceId            SL-CSI-RS-ResourceId
    sl-CSI-RS-FreqAllocation-r16    CHOICE {
        sl-OneAntennaPort-r16           BIT STRING (SIZE (12)),
        sl-TwoAntennaPort-r16           BIT STRING (SIZE (6))
    }
    sl-CSI-RS-FirstSymbol-r16       INTEGER (3..12)
    ...
}
-- TAG-SIB12-STOP
-- ASN1STOP
```

RRCReconfiguration message

```
-- ASN1START
-- TAG-RRCRECONFIGURATION-START
RRCReconfiguration ::=                  SEQUENCE {
    rrc-TransactionIdentifier           RRC-TransactionIdentifier,
    criticalExtensions                  CHOICE {
        rrcReconfiguration              RRCReconfiguration-IEs,
        criticalExtensionsFuture        SEQUENCE {}
    }
}

RRCReconfiguration-IEs ::=              SEQUENCE {
    radioBearerConfig                   RadioBearerConfig                                               OPTIONAL,   -- Need M
    secondaryCellGroup                  OCTET STRING (CONTAINING CellGroupConfig)                       OPTIONAL,   -- Cond SCG
    measConfig                          MeasConfig                                                      OPTIONAL,   -- Need M
    lateNonCriticalExtension            OCTET STRING                                                    OPTIONAL,
    nonCriticalExtension                RRCReconfiguration-v1530-IEs                                    OPTIONAL
}

RRCReconfiguration-v1610-IEs ::=        SEQUENCE {
    otherConfig-v1610                   OtherConfig-v1610                                               OPTIONAL,   -- Need M
    bap-Config-r16                      SetupRelease { BAP-Config-r16 }                                 OPTIONAL,   -- Need M
    iab-IP-AddressConfigurationList-r16 IAB-IP-AddressConfigurationList-r16                             OPTIONAL,   -- Need M
    conditionalReconfiguration-r16      ConditionalReconfiguration-r16                                  OPTIONAL,   -- Need M
    daps-SourceRelease-r16              ENUMERATED {true}                                               OPTIONAL,   -- Need M
    t316-r16                            SetupRelease {T316-r16}                                         OPTIONAL,   -- Need M
    needForGapsConfigNR-r16             SetupRelease {NeedForGapsConfigNR-r16}                          OPTIONAL,   -- Need M
    onDemandSIB-Request-r16             SetupRelease { OnDemandSIB-Request-r16 }                        OPTIONAL,   -- Need M
    dedicatedPosSysInfoDelivery-r16     OCTET STRING (CONTAINING PosSystemInformation-r16-IEs)          OPTIONAL,   -- Need M
    sl-ConfigDedicatedNR-r16            SetupRelease {SL-ConfigDedicatedNR-r16}                         OPTIONAL,   -- Need M
    sl-ConfigDedicatedEUTRA-Info-r16    SetupRelease {SL-ConfigDedicatedEUTRA-Info-r16}                 OPTIONAL,   -- Need M
    nonCriticalExtension                RRCReconfiguration-r17-IEs                                      OPTIONAL
}

RRCReconfiguration-r17-IEs ::=          SEQUENCE {
    sl-DirConfigDedicatedNR-r17         SL-DirConfigDedicated-r17
    ...,
    nonCriticalExtension                SEQUENCE {}                                                     OPTIONAL
}

SL-DirConfigDedicated-r17 ::=           SEQUENCE {
    sl-DirConfigID-r17                  INTEGER (1..SL-MaxDirConfiguration)
    sl-DirRangingCommonNR-r17 ::=       SEQUENCE {
        sl-DirRangingNR-ToAddModList-r17    SEQUENCE (SIZE (1..maxNrofSLRB-r16)) OF SL-CSI-RS-Config-r17    OPTIONAL,  -- Need N
        sl-DirRangingNR-ReleaseList-r17     SEQUENCE (SIZE (1..maxNrofSLRB-r16)) OF SLRB-PC5-ConfigIndex-r16  OPTIONAL, -- Need N
        sl-ConfigDedicatedNR-r16            SL-ConfigDedicatedNR-r16
    }
}

CSI-ReportConfig
    Initial_Interval                INTEGER (1..maxInterval),
    Interval_Factor                 ENUMERATED {p00, p05, p10, p15, p20, p25, p30, p40, p50, p60, p70, p75, p80, p85, p90, p95},
    Initial_Distance                INTEGER (1..maxDistance),
    Distance_Factor                 ENUMERATED {p00, p05, p10, p15, p20, p25, p30, p40, p50, p60, p70, p75, p80, p85, p90, p95},
    Timer_Command_Value             INTEGER (1..maxInterval),
    Max_Num_Factor                  INTEGER (1..maxNumFactor),
    Distance                        INTEGER (0..maxDistance)
}

-- TAG-RRCRECONFIGURATION-STOP
-- ASN1STOP
```

FIG. 9

```
-- ASN1START
-- TAG-SIDELINKUEINFORMATIONNR-START

SidelinkUEInformationNR-r16 ::=   SEQUENCE {
    criticalExtensions                CHOICE {
        sidelinkUEInformationNR-r16       SidelinkUEInformationNR-r16-IEs,
        criticalExtensionsFuture          SEQUENCE {}
    }
}

SidelinkUEInformationNR-r16-IEs ::= SEQUENCE {
    sl-RxInterestedFreqList-r16       SL-InterestedFreqList-r16        OPTIONAL,
    sl-TxResourceReqList-r16          SL-TxResourceReqList-r16         OPTIONAL,
    sl-FailureList-r16                SL-FailureList-r16               OPTIONAL,
    lateNonCriticalExtension          OCTET STRING                     OPTIONAL,
    UE-TxAntennaParamList-R17         UE-TxAntennaParamList-R17
    nonCriticalExtension              ...
}

UE-TxAntennaParamList-R17 ::=     SEQUENCE (SIZE (1..maxNrofTxAntenna-r17)) OF UE-TxAntennaParam-r17

UE-TxAntennaParam-r17 ::=         SEQUENCE {
    antennaPortsID                    INTEGER (0..maxNrofTxAntenna-r17-1),
    frequencyRangeLo                  ARFCN-ValueNR
    frequencyRangeHi                  ARFCN-ValueNR
    numAntennaArrayElementsN1         INTEGER (1..maxNrofTxAntennaN1-Elements-r17)
    numAntennaArrayElementsN2         INTEGER (1..maxNrofTxAntennaN2-Elements-r17)
    AntennaAzimuthToTopDevice         INTEGER (0..359)
    AntennaZenithToAzimuth            INTEGER (-180..180)
    nonCriticalExtension              SL-DirDetrminationResult-r17
}

SL-DirDeterminationResult-r17 ::= SEQUENCE {
    sl-DirConfigID                    INTEGER (0..SL-MaxDirConfiguration)
    BeamID                            YYYY
    BeamQoS                           XXXX
    UE-Pich                           INTEGER (-180..180)
    UE-Roll                           INTEGER (-180..180)
    UE-Yaw                            INTEGER (0..359)
    sl-CSI-ReportConfig               SL-CSI-ReportConfig
}

SL-CSI-ReportConfig ::=           SEQUENCE {
    reportConfigId                    CSI-ReportConfigId
    ..
    reportQuantity                    CHOICE {
        none                              NULL,
        cri-RSRP                          NULL,
        ssb-Index-RSRP                    NULL,
    }
}

-- TAG-SIDELINKUEINFORMATIONNR-STOP
-- ASN1STOP
```

DETERMINING PERIODICITY OF SIDELINK COMMUNICATIONS WITHIN THE NETWORK COVERAGE

CROSS REFERENCE

This Nonprovisional application claims priority under 35 U.S.C. § 119 on provisional Application No. 63/151,606 on Feb. 19, 2021, the entire contents of which are hereby incorporated by reference.

TECHNICAL FIELD

The present disclosure generally relates to wireless communications, more specifically, relates to determining the periodicity of sidelink (SL) communications while within a network coverage.

BACKGROUND ART

The 3rd Generation Partnership Project (3GPP) Vehicle to Everything (V2X) services will be used to transport Basic Safety Message (BSM) in the Society of Automotive Engineers (SAE) Standard J2735. The BSM includes two parts: (1) BSM Part 1, which contains the core data elements (e.g., vehicle size, position, speed, heading acceleration, brake system status, etc.) and is transmitted approximately 10× per second, and (2) BSM Part 2 which contains a variable set of data elements drawn from many optional data elements and is transmitted less frequently than BSM Part 1. The BSM is expected to have a transmission range of approximately 1,000 meters, and is tailored for localized broadcast required by V2V safety applications.

In the 3GPP Release-14 (Rel-14) Long Term Evolution (LTE) V2X (LTE V2X), a basic set of requirements for V2X service in Technical Report (TR) 22.885 is supported, which are considered sufficient for basic road safety service. An LTE V2X enabled vehicle (e.g., a vehicle configured with a UE the supports V2X applications) can directly exchange status information via a PC5 interface for direct communication. In the present disclosure, SL defines the procedures for realizing a single-hop UE-UE communication, similarly to Uplink and Downlink which define the procedures for UE-BS and BS-UE access, respectively. Along the same lines PC5 was introduced as the new direct UE interface, similarly to the Uu (User Equipment (UE)-Base Station (BS)/BS-UE) interface. Thus, the PC5 interface is also known as SL at the physical layer such as position, speed and heading, with other nearby vehicles, infrastructure nodes and/or pedestrians that are also enabled with LTE V2X.

In the 3GPP Release-16 (Rel-16), New Radio (NR) provides higher throughput, lower latency and higher reliability as compared to LTE, via a combination of enchantments to protocol numerology, usage of higher frequency bands (e.g., mm Wave Frequencies) and a selection of wider subcarrier spacing (SCS) (e.g., 30 kHz, 60 kHz, 120 kHz, and/or 240 kHz, in addition to the 15 kHz used by LTE) to match the higher frequency bands, and process for beam management (BM). The 3GPP Rel-16 NR is expected to provide an enhanced V2X service (aka NR V2X) (see the Service and System Aspects 1 (SA1) Study on Improvement of V2X Service Handling for Rel-16 (aka FS_V2XIMP)) which leverages the higher throughput, lower latency and higher reliability provided by the 3GPP Rel-16 NR data transport services.

The SA1 has a new study in the 3GPP Release-18 (Rel-18) (S1-202304) that considers how NR may support a ranging-based application for determination of the distance and direction between two UEs (e.g., between two vehicles, between a vehicle and a bystander, between two bystanders or any other users), as this kind of application is not yet served well by the 3GPP.

Therefore, there is a need in the art for a mechanism to determine the distance and direction between two UEs when at least one of the UEs is within the network coverage (e.g., next generation (e.g., 5th Generation (5G) New Radio (NR)) wireless network coverage), and to determine how often such mechanism should be performed, as at least one of the UEs move closer to, or further away from, the other UE.

SUMMARY OF INVENTION

In one example, a first user equipment (UE) for sidelink communication with a second UE, the first UE comprising: one or more non-transitory computer-readable media having computer-executable instructions embodied thereon; and at least one processor coupled to the one or more non-transitory computer-readable media, and configured to execute the computer-executable instructions to: receive, at the first UE, a first resource set from a cell to establish a first sidelink channel with the second UE, the first resource set indicating at least a first distance between the first UE and the second UE; establish the first sidelink channel with the second UE based on the first resource set; transmit a set of parameters associated with the established first sidelink channel to the cell; set a first timer based on at least the first distance indicated in the first resource set, the first timer for determining when to establish a second sidelink channel with the second UE; and when the first timer is expired and no second resource set is received from the cell, establish the second sidelink channel with the second UE based on the first resource set.

BRIEF DESCRIPTION OF DRAWINGS

Implementations of the present technology will now be described, by way of example only, with reference to the attached figures.

FIG. 3B illustrates flowchart of a ranging method/process by a first UE for determining relative distance and direction from the first UE to a second UE when at least the first UE is within the network coverage, according to an example implementation of the present application.

FIG. 3C illustrates flowchart of a ranging method/process by a first UE for determining relative distance and direction from the first UE to a second UE when at least the first UE is within the network coverage, according to an example implementation of the present application.

FIG. 4 illustrates contents of example ranging configuration resource sets (hereinafter "resource sets") configured by the network (e.g., a V2X Control Function), according to an example implementation of the present application.

FIG. 6 illustrates an example of a UE capability indication, according to an example implementation of the present application.

FIG. 7 illustrates an example of a new NR SIB12, according to an example implementation of the present application.

FIG. 8 illustrates an example of a new RRC Reconfiguration (RRCReconfiguration) message, according to an example implementation of the present application.

FIG. 9 illustrates an example of a new Sidelink UE Information NR (SidelinkUEInformationNR) message, according to an example implementation of the present application.

DESCRIPTION OF EMBODIMENTS

Figure 1A:
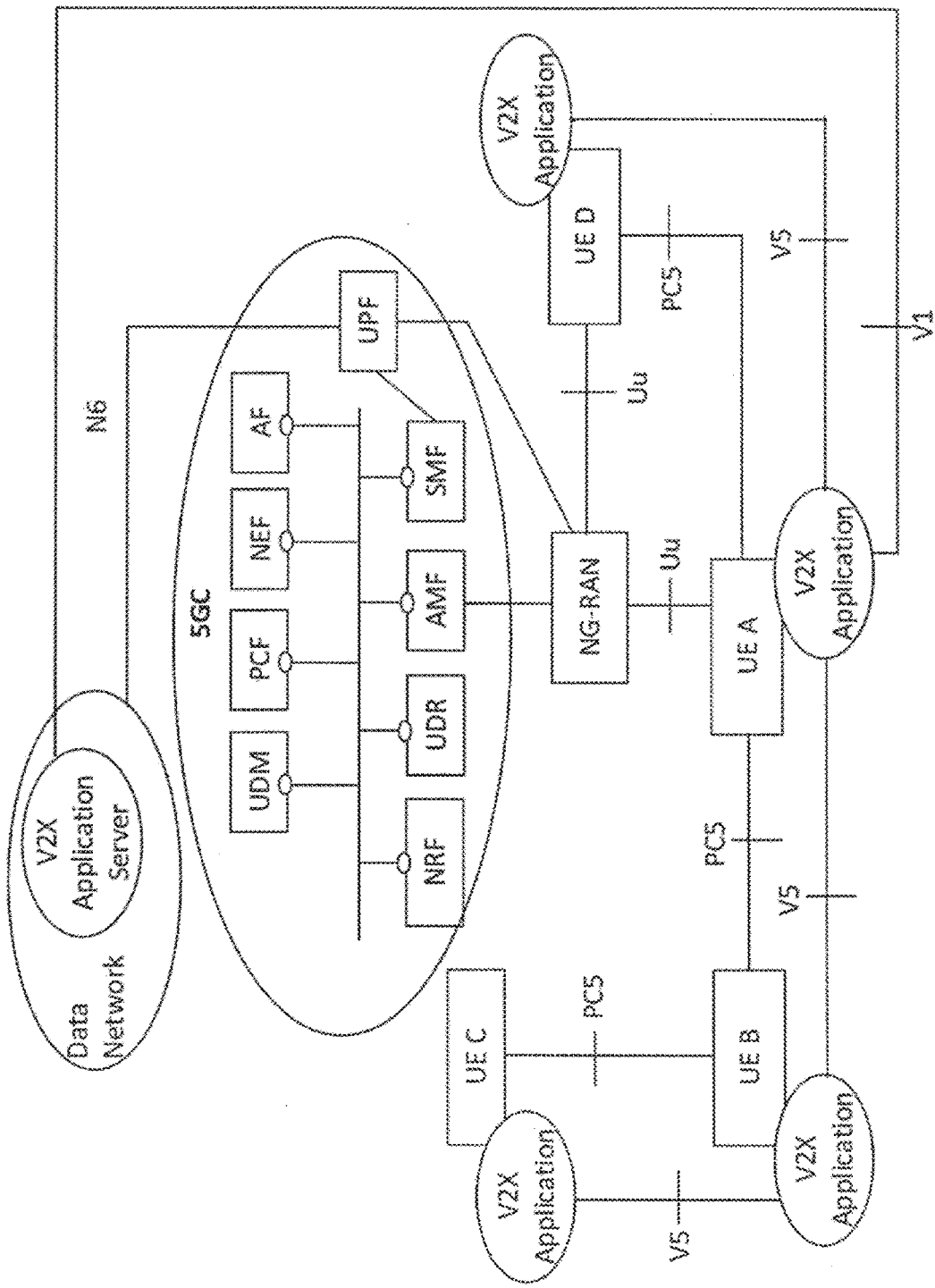
FIG. 1A illustrates a 5G System architecture for V2X communication over PC5 and Uu reference points and AF-based service parameter provisioning for V2X communications in the 3GPP TS 23.287, according to an example implementation of the present application.

The 3GPP is a collaboration agreement that aims to define globally applicable technical specifications and technical reports for third and fourth generation wireless communication systems. The 3GPP may define specifications for next generation mobile networks, systems and devices.

3GPP LTE is the name given to a project to improve the Universal Mobile Telecommunications System (UMTS) mobile phone or device standard to cope with future requirements. In one aspect, UMTS has been modified to provide support and specification for the Evolved Universal Terrestrial Radio Access (E-UTRA) and Evolved Universal Terrestrial Radio Access network system (E-UTRAN).

At least some aspects of the systems and methods disclosed herein may be described in relation to the 3GPP LTE, LTE-Advanced (LTE-A) and other standards (e.g., 3GPP Releases 8, 9, 10, 11, 12, 13, 14 and/or 15) including New Radio (NR) which is also known as 5G. However, the scope of the present disclosure should not be limited in this regard. At least some aspects of the systems and methods disclosed herein may be utilized in other types of wireless communication systems.

A wireless communication device may be an electronic device used to communicate voice and/or data to a base station (BS), which in turn may communicate with a network of devices (e.g., public switched telephone network (PSTN), the Internet, etc.). In describing systems and methods herein, a wireless communication device may alternatively be referred to as a mobile station, a UE, an access terminal, a subscriber station, a mobile terminal, a remote station, a user terminal, a terminal, a subscriber unit, a mobile device, etc. Examples of wireless communication devices may include cellular phones, smart phones, personal digital assistants (PDAs), laptop computers, netbooks, e-readers, wireless modems, etc.

In the 3GPP specifications, a wireless communication device may typically be referred to as a UE. However, as the scope of the present disclosure should not be limited to the 3GPP standards, the terms "UE" and "wireless communication device" may be used interchangeably herein to mean the more general term "wireless communication device." A UE may also be more generally referred to as a terminal device.

In the 3GPP specifications, a BS is typically referred to as a Node B, an evolved Node B (eNB), a home enhanced or evolved Node B (HeNB), a next Generation Node B (gNB) or some other similar terminology. As the scope of the disclosure should not be limited to 3GPP standards, the terms "base station," "Node B," "eNB," "HeNB," and "gNB" may be used interchangeably herein to mean the more general term "base station." Furthermore, the term "base station" or "BS" may be used to denote an access point. An access point may be an electronic device that provides access to a network (e.g., Local Area Network (LAN), the Internet, etc.) for wireless communication devices. The term "communication device" may be used to denote both a wireless communication device and/or a base station. An eNB and/or gNB may also be more generally referred to as a base station device.

It should be noted that as used herein, a "cell" may be any communication channel that is specified by standardization or regulatory bodies to be used for International Mobile Telecommunications-Advanced (IMT-Advanced) and all of it or a subset of it may be adopted by 3GPP as licensed bands (e.g., frequency bands) to be used for communication between an eNB and a UE. It should also be noted that in E-UTRA and E-UTRAN overall description, as used herein, a "cell" may be defined as "combination of downlink and optionally uplink resources." The linking between the carrier frequency of the downlink resources and the carrier frequency of the uplink resources may be indicated in the system information transmitted on the downlink resources.

"Configured cells" are those cells of which the UE is aware and is allowed by an eNB and/or gNB to transmit or receive information. "Configured cell(s)" may be serving cell(s). The UE may receive system information and perform the required measurements on all configured cells. "Configured cell(s)" for a radio connection may include a primary cell and/or no, one, or more secondary cell(s).

"Activated cells" are those configured cells on which the UE is transmitting and receiving. That is, activated cells are those cells for which the UE monitors the physical downlink control channel (PDCCH) and in the case of a downlink transmission, those cells for which the UE decodes a physical downlink shared channel (PDSCH). "Deactivated cells" are those configured cells that the UE is not monitoring the transmission of PDCCH. It should be noted that a "cell" may be described in terms of differing dimensions. For example, a "cell" may have temporal, spatial (e.g., geo-graphical) and frequency characteristics.

The 5G communication systems, dubbed NR technologies by the 3GPP, envision the use of time/frequency/space resources to allow for services, such as eMBB transmission, URLLC transmission, and massive Machine Type Communication (mMTC) transmission. Also, in NR, single-beam and/or multi-beam operations is considered for downlink and/or uplink transmissions.

Various examples of the systems and methods disclosed herein are now described with reference to the figures, where like reference numbers may indicate functionally similar elements. The systems and methods as generally described and illustrated in the Figures herein could be arranged and designed in a wide variety of different implementations. Therefore, the detailed description of the present disclosure as illustrated in the figures is not intended to limit scope of the present disclosure but is merely representative of the systems and methods.

Starting with the 3GPP Rel-18, NR is expected to be capable of supporting higher frequencies and enhanced SL channel configurations that enable Beam Management of the SL signals.

Since the 3GPP Rel-18, NR has been capable of NR V2X SL communications, whereby the 5GC (5G Core Network) configures, and the NG-RAN broadcasts, NR V2X SL communications configuration information in SIB12 for use by NR UEs that provide NR V2X services. SIB12 contains an Information Element (IE) known as SL-ConfigCommonNR-r16. This IE is used to specify UE autonomous resource selection for NR V2X SL communication when the UE is in CONNECTED mode (and, in some embodiments, in IDLE mode).

According to various implementations of the present disclosure, a new mechanism in an NR V2X capable UE and a new operation in the NR V2X resource selection function are provided to leverage physical layer Beam Management configurations in conjunction with one or more SL channels to determine the identity of the optimal beam for establishing an SL connection as instigated from a first UE to a second UE (e.g., for the purpose of distance and direction determination from the first UE to the second UE).

In the 3GPP Rel-18 (S1-202304), a "ranging" function is different than a "positioning" function in that a positioning function resolves the location of a device on a standard grid, while a ranging function resolves the direction (e.g., azimuth in a horizontal plane), inclination (e.g., altitude in the vertical plane) and distance from one device to another. The objective of the SA1 study item is to study the use cases and potential service requirements for services utilizing distance and/or direction. Aspects to be studied may include identifying use cases and potential requirements of ranging-based services directly between two or more UEs (e.g., accuracy of distance and direction, maximum range distance, ranging latency, energy/battery consumption, etc.) and gap analysis with existing mechanisms to enable ranging-based services.

According to various implementations of the present disclosure, a direction ranging method uses a distance/direction ranging configuration resource set (hereinafter "resource set") provided by a base station (e.g., an NR V2X Control Function associated with the base station) to configure the physical layer of a distance/direction ranging UE's (e.g., the first UE) SL channels. The NR V2X Control Function may provide to the first UE's distance/direction ranging mechanism a plurality of resource sets, whereby the first (or initial) resource set may be followed by one or more subsequent resource sets and the delivery of a subsequent resource set may be dependent upon a determination made by the NR V2X Control Function regarding the results of the distance/direction ranging process per the use of the initial (or previous) resource set.

For example, the distance and direction between two moving UEs, such as two different vehicles, may be important to prevent a potential collision between the UEs. As another example, a first UE (e.g., a mobile phone) may be able to locate a second UE (e.g., an item in a big store) by determining a distance and direction from the first UE to the second UE. In the latter example, as the first UE moves toward, or away from, the second UE, the process of calculating the distance and direction (may also be referred to as a distance/direction ranging process, or a ranging process hereinafter) may have to be performed repeatedly to identify more accurate distances and/or directions from the first UE to the second UE.

According to one implementation of the present disclosure, a processor residing in a first UE may determine a relative distance/direction between a first UE and a second UE via a beam that a Beam Management (BM) process may have been selected for the transmission of NR signals over the SL channel. The process may then relate the selected beam's orientation to the transmit (Tx) antenna and relate the Tx antenna's orientation to the UE. In addition, a heading from a first UE to a second UE can then further be determined by relating the first UE's (and its antenna) orientation to a magnetic bearing such as North. In some aspects of the present implementations, the first UE may determine the relative distance/direction between the first UE and the second UE by providing the network (e.g., the NR V2X Control Function) with data corresponding to the results of the beam selection and QoS measurements (e.g., which are received from the second UE). After the network performs the distance/direction determination process, the network may send back the results of the process (e.g., a distance between the UEs, a direction from the first UE to the second UE, etc.) to the first UE.

To execute such a method, a UE (e.g., an NR V2X UE) may be preconfigured by a gNB in such a way that its physical layer parameters or information elements determining a given transmission scheme transmit a given number of transmission beams on the NR SL channel where, each beam is centered on a given radial from the Tx antenna, no two beam occupy the same radial, each beam has at a given width, and the configuration is made according to the available sidelink (e.g., V2X) frequency.

Furthermore, the UE may in a subsequent action, as directed by the network, reconfigure the physical layer to transmit a different number of transmission beams, and beam widths in a different frequency range, whereby the subsequent reconfiguration may depend on the results of the previous configuration. For example, following an initial distance/direction determination, the method may further determine that a more accurate distance/direction may be attained by reconfiguring the SL channel to use a different set of Tx beams and beam widths and frequency range.

In some of the present implementations, a first UE may determine the distance and direction to a second UE (e.g., through a ranging process performed at different time intervals by the NR V2X Control Function). The time intervals may be determined based on the first UE's distance to the second UE. Each time the time interval expires, the first UE may initiate a new SL channel with the second UE based on a resource set that is received from a cell associated with a base station. As will be discussed in more detail below, in some aspects of the present implementations, instead of receiving a new resource set, the UE may use the current resource set, or an initial resource set, to initiate a new (or use the current) sidelink channel (e.g., after a time interval expires).

In some implementations, a first UE may determine a relative distance between the first UE and the second UE, for example by sending the QoS associated with the sidelink connection (e.g., determined via a BM process) to NR V2X Control Function and receiving the relative distance back from the NR V2X Control Function. The first UE may then use that relative distance information in such a manner that the network may configure the physical layer with an initial interval, and an initial distance. In some implementations, the ranging process may be executed at a default/initial interval when the first UE is at an unknown distance from the second UE, or the first UE is at a distance that is greater than a default/initial distance from the second UE.

Additionally, as will be discussed in more detail below, the network may configure the physical layer with an interval factor and a distances factor, which may be iteratively applied to the default/initial interval and initial distance, respectively, as the first UE moves toward, or further away from, the second UE (e.g., determined by the network). Thus, in some implementations, as the first UE gets closer to, or farther from, the second UE, the interval of performing the ranging process (e.g., to determine the new direction and distance) may change by the interval factor as a function of the distance factor applied to the initial distance value. For example, as the UEs move closer to each other (or the first UE moves closer to the second UE), the time intervals for performing the ranging process (or to initiate a new SL channel) may decrease in time, whereas if the UEs move away from each other, the time intervals for performing the ranging process may increase in time.

For example, when a first UE makes a first attempt to make a distance/direction determination to a second UE, the first UE may not know the distance to the second UE and may use an initial interval (e.g., 30 ms, 40 ms, etc.), as configured to the first UE (e.g., by a cell associated with a gNB), or at time of manufacture. Then, when the first UE determines that the second UE is at a distance less than the initial distance (e.g., but greater than half of the initial distance) to the second UE (e.g., a distance factor of 0.5), the interval may be reduced, for example, to half of the initial interval (e.g., an interval factor of 0.5). Similarly, when the distance is between ½ and ¼ of the initial distance, the interval between performing the ranging process may be further reduced to ¼ of the initial interval, or when the distance is between ¼ and ⅛ of the initial distance, the interval may be further reduced to ⅛ of the initial interval.

This process may be continued until a minimum interval is established, or the process terminates for some other reasons in some implementations. Alternately, as the first UE moves away from the second UE, but is still less than the default distance, the time intervals for performing the ranging process may increase in time as a function of distance in a stepwise manner, as described above.

It should be noted that in some implementations, the time and distance factors may be the same, while in other embodiments the time and distance factors may be different. For example, in some implementations, if only one value for both factors is provided, that value may be used for both the time interval factor and the distance factor. In some implementations, the physical layer may be configured with an initial interval, a minimum interval, an interval factor, an initial distance, and a distance factor.

In NR, there are roughly two large frequency range specified in the 3GPP. One is below 6 GHz and is what we usually call sub 6 GHz (e.g., FR1). The other is above 6 GHz and is what we usually call millimeter wave (e.g., FR2). Depending on the frequency ranges (e.g., between FR1 and FR2), the maximum bandwidth and subcarrier spacing may vary. For example, in FR1, the maximum bandwidth is 100 MHz, while in the FR2 range the maximum bandwidth is 400 MHz. Some subcarrier spacing (e.g., 15 KHs or 30 KHz) may be used only in FR1, while some other subcarrier spacing (e.g., 120 KHz or 240 KHz) can be used in FR2 only. Additionally, some subcarrier spacing (e.g., 60 KHz) may be used both within FR1 and FR2 ranges.

As mentioned above, two types of frequency range are defined in 3GPP. Sub 6 GHz range is called FR1, and millimeter wave range is called FR2. The exact frequency range for FR1 (sub 6 GHz) and FR2 (millimeter wave) are defined as below in Table 5.1-1 of the 3GPP 38.101-1.

TABLE 5.1-1

Definition of frequency ranges.

| Frequency range designation | Corresponding frequency range |
|---|---|
| FR1 | 450 MHz-6000 MHz |
| FR2 | 24250 MHz-52600 MHz |

The NR operating bands in FR1 are listed in Table 5.2-1 of the 3GPP 38.101-1.

TABLE 5.2-1

NR operating bands in FR1

| NR Operating Band | Uplink (UL) operating band BS receive UE transmit $F_{UL\_low}$-$F_{UL\_high}$ | total BW | Downlink (DL) operating band BS transmit UE receive $F_{DL\_low}$-$F_{DL\_high}$ | total BW | Duplex Mode |
|---|---|---|---|---|---|
| n1 | 1920 MHz-1980 MHz | 60 | 2110 MHz-2170 MHz | 60 | FDD |
| n2 | 1850 MHz-1910 MHz | 60 | 1930 MHz-1990 MHz | 60 | FDD |
| n3 | 1710 Mhz-1785 MHz | 75 | 1805 MHz-1880 MHz | 75 | FDD |
| n5 | 824-849 MHz | 25 | 869 MHz-894 MHz | 25 | FDD |
| n7 | 2500 MHz-2570 MHz | 70 | 2620 MHz-2690 MHz | 70 | FDD |
| n8 | 880 MHz-915 MHz | 35 | 925 MHz-960 MHz | 35 | FDD |
| n20 | 832 MHz-862 MHz | 30 | 791 MHz-821 MHz | 30 | FDD |
| n28 | 703 MHz-748 MHz | 45 | 758 MHz-803 MHz | 45 | FDD |
| n38 | 2570 MHz-2620 MHz | 50 | 2570 MHz-2620 MHz | 50 | TDD |
| n41 | 2496 MHz-2690 MHz | 194 | 2496 MHz-2690 MHz | 194 | TDD |
| n50 | 1432 MHz-1517 MHz | 85 | 1432 MHz-1517 MHz | 85 | TDD |
| n51 | 1427 MHz-1432 MHz | 5 | 1427 MHz-1432 MHz | 5 | TDD |

TABLE 5.2-1-continued

NR operating bands in FR1

| NR Operating Band | Uplink (UL) operating band BS receive UE transmit $F_{UL\_low}$-$F_{UL\_high}$ | total BW | Downlink (DL) operating band BS transmit UE receive $F_{DL\_low}$-$F_{DL\_high}$ | total BW | Duplex Mode |
|---|---|---|---|---|---|
| n66 | 1710 MHz-1780 MHz | 70 | 2110 MHz-2200 MHz | 90 | FDD |
| n70 | 1695 MHz-1710 MHz | 15 | 1995 MHz-2020 MHz | 25 | FDD |
| n71 | 663 MHz-698 MHz | 35 | 617 MHz-652 MHz | 35 | FDD |
| n74 | 1427 MHz-1470 MHz | 43 | 1475 MHz-1518 MHz | 43 | FDD |
| n75 | N/A | | 1432 Mhz-1517 MHz | 85 | SDL |
| n76 | N/A | | 1427 Mhz-1432 MHz | 5 | SDL |
| n78 | 3300 MHz-3800 MHz | 500 | 3300 MHz-3800 MHz | 500 | TDD |
| n77 | 3300 MHz-4200 MHz | 900 | 3300 MHz-4200 MHz | 900 | TDD |
| n79 | 4400 MHz-5000 MHz | 600 | 4400 MHz-5000 MHz | 600 | TDD |
| n80 | 1710 MHz-1785 MHz | 75 | N/A | | SUL |
| n81 | 880 MHz-915 MHz | 35 | N/A | | SUL |
| n82 | 832 MHz-862 MHz | 30 | N/A | | SUL |
| n83 | 703 MHz-748 MHz | 45 | N/A | | SUL |
| n84 | 1920 MHz-1980 MHz | 60 | N/A | | SUL |

The NR operating bands in FR2 are listed in Table 5.2-1 of the 3GPP 38.101-2.

TABLE 5.2-1

NR operating bands in FR2

| NR Operating Band | Uplink (UL) operating band BS receive UE transmit $F_{UL\_low}$-$F_{UL\_high}$ | total BW | Downlink (DL) operating band BS transmit UE receive $F_{DL\_low}$-$F_{DL\_high}$ | total BW | Duplex Mode |
|---|---|---|---|---|---|
| n257 | 26500 MHz-29500 MHz | 3000 | 26500 MHz-29500 MHz | 3000 | TDD |
| n258 | 24250 MHz-27500 MHz | 3260 | 24250 MHz-27500 MHz | 3260 | TDD |
| n260 | 37000 MHz-40000 MHz | 3000 | 37000 MHz-40000 MHz | 3000 | TDD |

The applicable SS raster entries per operating band (FR1) are listed in Table 5.4.3.3-1 of the 3GPP 38.104 v15.1.0.

TABLE 5.4.3.3-1

Applicable SS raster entries per operating band (FR1)

| NR Operating Band | SS Block SCS | SS Block pattern[1] | Range of GSCN (First-<Step size>-Last) |
|---|---|---|---|
| n1 | 15 kHz | Case A | [7039-<1>-7224] |
| n2 | 15 kHz | Case A | [6439-<1>-6624] |
| n3 | 15 kHz | Case A | [6022-<1>-6258] |
| n5 | 15 kHz | Case A | [2902-<1>-2973] |
|  | 30 kHz | Case B | [2911-<1>-2964] |
| n7 | 15 kHz | Case A | [8740-<1>-8958] |
| n8 | 15 kHz | Case A | [3091-<1>-3192] |
| n20 | 15 kHz | Case A | [2644-<1>-2727] |
| n28 | 15 kHz | Case A | [2533-<1>-2667] |
| n38 | 15 kHz | Case A | [8572-<1>-8958] |
| n41 | 15 kHz | Case A | [9069]-<TBD>-[9199] |
|  | 30 kHz | Case C | [9070-<1>-9198] |
| n50 | 15 kHz | Case A | [4780-<1>-5049] |
| n51 | 15 kHz | Case A | [4762-<1>-4764] |
| n66 | 15 kHz | Case A | [7039-<1>-[7326] |
|  | 30 kHz | Case B | [7048-<1>-[7317] |
| n70 | 15 kHz | Case A | [6655-<1>-[6726] |
| n71 | 15 kHz | Case A | [2062-<1>-2166] |

TABLE 5.4.3.3-1-continued

Applicable SS raster entries per operating band (FR1)

| NR Operating Band | SS Block SCS | SS Block pattern[1] | Range of GSCN (First-<Step size>-Last) |
|---|---|---|---|
| n74 | 15 kHz | Case A | [4924-<1>-5052] |
| n75 | 15 kHz | Case A | [4780-<1>-5049] |
| n76 | 15 kHz | Case A | [4762-<1>-4764] |
| n77 | 30 kHz | Case C | [9628-<1>-10247] |
| n78 | 30 kHz | Case C | [9628-<1>-9969] |
| n79 | 30 kHz | Case C | [10393]-<TBD>-[10802] |

The applicable SS raster entries per operating band (FR2) are listed in Table 5.4.3.3-of the 3GPP 38.104 v15.1.0.

TABLE 5.4.3.3-2

Applicable SS raster entries per operating band (FR2)

| NR Operating Band | SS Block SCS | SS Block pattern[1] | Range of GSCN (First-<Step size>-Last) |
|---|---|---|---|
| n257 | 120 kHz | Case D | [24306-<1>-24476] |
|  | 240 kHz | Case E | [24308-<2>-24474] |
| n258 | 120 kHz | Case D | [24175-<1>-24361] |
|  | 240 KHz | Case E | [24176-<2>-24360] |
| n260 | 120 kHz | Case D | [24913-<1>-25084] |
|  | 240 kHz | Case E | [24916-<2>-25080] |

The millimeter-wave (mmWave) frequencies (e.g., higher frequencies in FR2) offer the availability of very wide bandwidths, which support the high data rates required by NR. However, mmWave links are highly susceptible to rapid channel variations and suffer from severe free-space pathloss and atmospheric absorption. To address these challenges, the NR base stations and the NR UEs may use highly directional Tx antennas to achieve sufficient link budget in wide area networks. One consequence of the directional Tx antennas could be the need to transmit multiple narrow/directional beams. In NR, the concept of Beam Management (BM) may be used in high frequency bands (e.g., such as in FR2) to configure and coordinate the multiple narrow/directional transmission beams used by a multi-beam based system (e.g., the configuration and coordination of beams used by a directional multi-beam based communication system).

FIG. 1A illustrates a non-roaming 5G System architecture for sidelink (e.g., V2X) communication over PC5 and Uu reference points (e.g., in the 3GPP 5G TS 23.287). In TS 23.287, it is specified that the Policy Control Function (PCF) defined in TS 23.501 may include a function to provision the UE and Access and Mobility Management Function (AMF) with necessary parameters in order to use sidelink communication. For example, the PCF may:

Determine the V2X Policy/Parameter for specific PC5 RAT to provision to the UE based on the received UE's PC5 Capability for V2X.

Determine whether to provision V2X Policy/parameters for V2X communication over PC5 reference point and/or V2X communication over Uu reference point to the UE.

Provision the UEs with authorization and policy parameters for V2X communication over PC5 reference point.

Provision the UEs with policy parameters for V2X communication over Uu reference point.

Provision the AMF with PC5 QoS parameters as defined in clause 5.4.2 used by NG-RAN.

Retrieve V2X parameters from UDR.

Figure 1B:
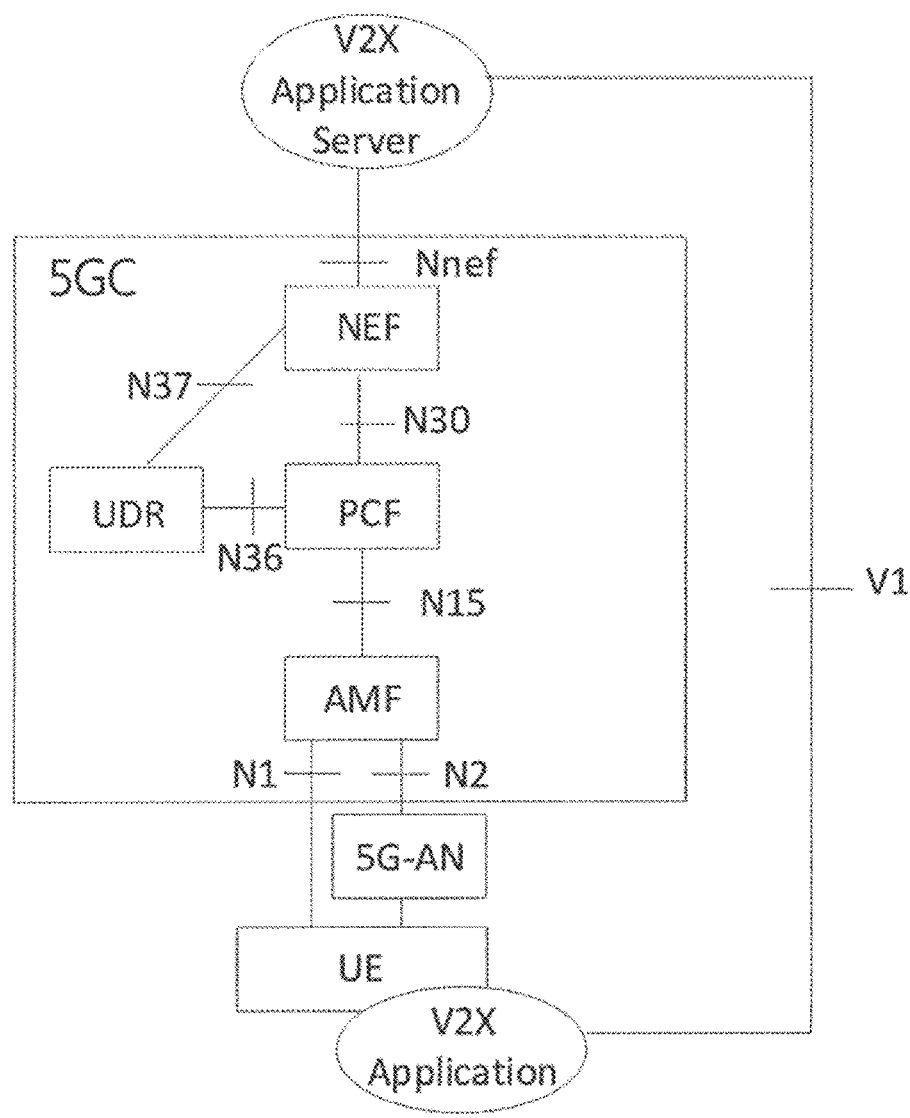
FIG. 1B illustrates a 5G System architecture for V2X communication over PC5 and Uu reference points and AF-based service parameter provisioning for V2X communications in the 3GPP TS 23.287, according to an example implementation of the present application.

FIG. 1B illustrates a 5G System architecture for AF-based service parameter provisioning for V2X communications in the 3GPP TS 23.287.

In FIG. 1B, the following are the reference points:

V1: The reference point between the V2X applications in the UE and in the V2X Application Server.

V5: The reference point between the V2X applications in the UEs. This reference point is not specified in the above-mentioned release of the specification.

PC5: The reference point between the UEs, which may include the LTE based PC5 and/or NR based PC5.

In addition to the relevant functions defined in TS 23.501 [6] for N1, in the case of V2X Service it is also used to convey the V2X policy and parameters (including service authorization) from AMF to UE and to convey the UE's V2X Capability and PC5 Capability for V2X information from UE to AMF.

N2: In addition to the relevant functions defined in TS 23.501 [6] for N2, in the case of V2X Service it is also used to convey the V2X policy and parameters (including service authorization) from AMF to NG-RAN.

Uu: The reference point between the UE and the NG-RAN.

In FIG. 2, the following are the service-based interfaces:

Nudm: In addition to the relevant services defined in TS 23.501 [6] for Nudm, in the case of V2X Service, services provided by UDM are used to get V2X Service related subscription information to AMF during Initial registration procedure or UE Configuration Update (UCU) procedure to inform AMF subscription information has changed.

Npcf: In addition to the relevant services defined in TS 23.501 [6] for Npcf, in the case of V2X Service, services provided by H-PCF are used to provide V2X Service related parameters to V-PCF for UE and NG-RAN in the roaming case.

Nudr: In addition to the relevant services defined in TS 23.501 [6] for Nudr, in the case of V2X Service, services provided by UDR are used to notify the PCF and the UDM of the update of the V2X Service related information.

Nnef: In addition to the relevant services defined in TS 23.501 [6] for Nnef, in the case of V2X Service, services provided by NEF are used by the V2X Application Server to update V2X Service related information of 5GC.

Namf: In addition to the relevant services defined in TS 23.501 [6] for Namf, in the case of V2X Service, services provided by AMF are consumed by PCF to provide the V2X Service related parameters for the UE and the NG-RAN to AMF, and to enable the AMF create or update UE context related to V2X service.

Nnrf: In addition to the relevant services defined in TS 23.501 [6] for Nnrf, in the case of V2X Service, services provided by NRF are used to discover the PCF that supports V2X.

In the 3GPP TS 23.287, it is specified that the V2X Application Server (V2X AS) includes AF (Application Function) functionality, and may support at least the following capabilities:

For V2X service handling:
Receive uplink data from the UE over unicast.
Send downlink data to the UE over unicast.
Request QoS Sustainability Analytics for potential supportable QoS changes in a geographic area from NWDAF via NEF.

For V2X service parameters provisioning,
Provision the 5GC with parameters for V2X communications over PC5 and Uu reference points.
Provision the UE with parameters for V2X communications over PC5 reference point and/or Uu reference point.

NOTE: The V2X Application Servers for V2X services handling and V2X service parameter provisioning can be the same or different.

In the 3GPP TS 23.287, it is specified that the AMF (Access and Mobility Management Function is defined in TS 23.501) functions defined in TS 23.501 performs the following functions:

Obtain from UDM the subscription information related to V2X and store them as part of the UE context data.
Select a PCF supporting V2X Policy/Parameter provisioning and report the PC5 Capability for V2X to the selected PCF.
Obtain from PCF the PC5 QoS information related to V2X and store it as part of the UE context data.
Provision the NG-RAN with indication about the UE authorization status about V2X communication over PC5 reference point.
Provision the NG-RAN with PC5 QoS parameters related to V2X communication.

In the 3GPP TS 23.287, it is specified the UDM (Unified Data Management, defined in TS 23.501) performs the following functions:
Subscription management for V2X communication over PC5 reference point.

In the 3GPP TS 23.287, it is specified the UDR (Unified Data Repository, defined in TS 23.501) performs the following functions:
Stores V2X service parameters.

In the 3GPP 5G TS 23.287, it is specified the NRF (Network Repository Function defined in TS 23.501) performs the following functions:
PCF discovery by considering V2X capability.

Thus, the PCF, AMF, V2X AS, UDM, UDR, NRF (aka the "NR V2X Control Function" as when taken together in this disclosure) are the logical functions that are used for network related actions required for NR V2X, and that the NR V2X Control Function is used to provision the UE with necessary parameters that enable the UE to use V2X communication. Thus, for NR V2X, an NR V2X Control Function may determine the sets of RF transmission resources, and BM configurations for the resources, to be used by the SL channel in support of a ranging-based operation for the determination of a relative distance and/or direction between two UEs. Additionally, the NR V2X Control Function may also determine a set of periodicity values (e.g., a default/initial interval value, a minimum interval value, an interval factor, a default/initial distance, and a distance factor) may be used for configuring the time interval at which a UE may execute a ranging-based operation (e.g., the ranging process) for the determination of the relative direction and distance between two UEs.

In one or more implementations of the present application, a UE may have hardware and/or a processor that may execute a method for informing a cell (e.g., an NR V2X Control Function of the cell) about the UE being capable of executing operations for the purpose of assisting the NR V2X Control Function in determining the relative distance/direction between two UEs using SL communication channel and Beam Management processing. In addition the method provides for the UE to inform the NR V2X Control Function about specific default values for relating the orientation of the UE's antenna array axis and antenna transmission beam to a default direction in a default reference plane (e.g., a value that equates that 0 degree in the horizontal plane may equate to a beam that radiates out of the top of the device) and default values for antenna attributes (e.g., the number of antenna array elements).

In one or more implementations of the present application, the network may have hardware and/or a processor that may execute a method for a base station (e.g., an NR V2X Control Function associated with a cell of the base station) to configure a UE with sets of resources (e.g., RF, BM, and periodicity) that may enable the UE to execute an operation for the beam selection and beam identification and periodic execution of operations that determine the distance and direction between the UEs. The sets of resources (e.g., RF, BM, periodicity) provided by the Control Function may include, but are not limited to, a set of sidelink (e.g., NR V2X) resource pools parameters, a set of BM configurations for those sidelink resources, a resource set unique ID, a set of periodicity values, etc. The RF and BM resource sets provided by the Control Function may enable the UE to configure the physical layer to generate a specific set of directional Tx beams when using the NR V2X RF transmission resources, and each directional Tx beam may be uniquely identified (e.g., by a beam index).

The periodicity values provided by the Control Function may, in some implementations, enable the UE to configure an interval rate at which the physical layer may execute an operation for the beam selection, beam identification via the transmission of a specific set of directional Tx beams when using the NR V2X RF transmission resources.

In one or more implementations of the present application, the network may have hardware and/or a processor that may execute a method for the Control Function to configure the UE with a set of periodicity values that may determine how frequently the UE may execute the operations of beam selection and beam identification aspect of the distance/directional determination. The set of periodicity values provided by the Control Function may include, but is not limited to, an "Initial Interval," a "Minimum Interval," an "Interval Factor," an "Initial Distance," and a "Distance Factor." The periodicity value set provided by Control Function may enable the UE to configure the physical layer to initiate a ranging process at specific intervals (e.g., the rate at which the ranging process may be conducted) based on the distance determination from a first UE to a second UE through identified by the network (e.g., NR V2X Control Function), where the intervals may change (e.g. increase or decrease in the rate of direction determination operations) as the network may determine that the first UE has moved closer to, or farther from, the second UE.

In one or more implementations of the present application, the method for the Control Function may configure the UE with an initial and subsequent set of RF, BM, and periodicity resources, whereby each resource set may be identified by a unique identifier.

In addition to executing an operation as part of a method for determining the direction and distance to a second UE, a first UE may execute an operation to determine a value that defines the intervals between sequential direction and distance operations and configure a timer with said value. Following the expiration of the timed interval, the first UE may then trigger a subsequent execution of a direction and distance operation. The first UE may then report the data obtained by the subsequent direction and distance determination operation (e.g., when they become available) to the NR V2X Control Function via a 3-tuple parameter including a Subsequent Resource set unique ID, a subsequent Beam Index, and a subsequent QoS.

The operation to determine the interval timer value may take into consideration two parts. The first part may be based on the distance from the first UE to the second UE, whereby the distance is determined and provided by the NR V2X Control Function after receiving the data obtained from the results of a previous distance and directional determination operation. The second part may be based on a function that factors in the distance (e.g., the factors of the function may also be determined and provided by the NR V2X Control Function).

Alternately, the time interval may be described by a preconfigured time value (e.g., as determined and provided by the NR V2X Control Function prior to the first execution of the distance and direction determination process) as may occur when the distance from the first UE to the second UE may not be known by the first UE. Alternately, the time interval may be solely based on a value, as determined and provided by the NR V2X Control Function following a distance and direction determination, as may occur when the NR V2X Control Function is directly controlling the time interval between each distance and direction determination operation.

Figure 2A:
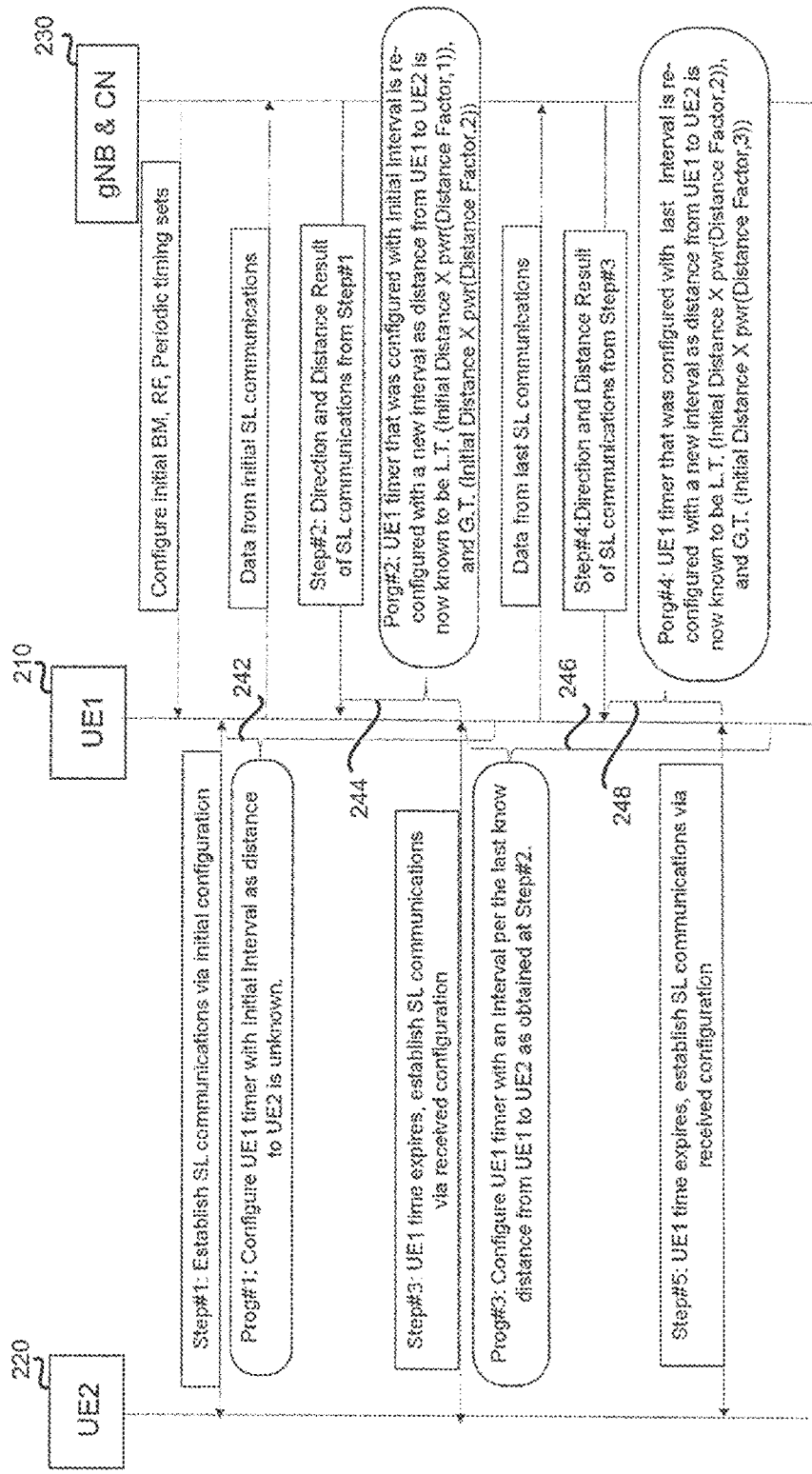
FIG. 2A illustrates example implementation for performing a ranging process and determining a time interval for performing a subsequent ranging process, according to an example implementation of the present application.
Figure 2B:
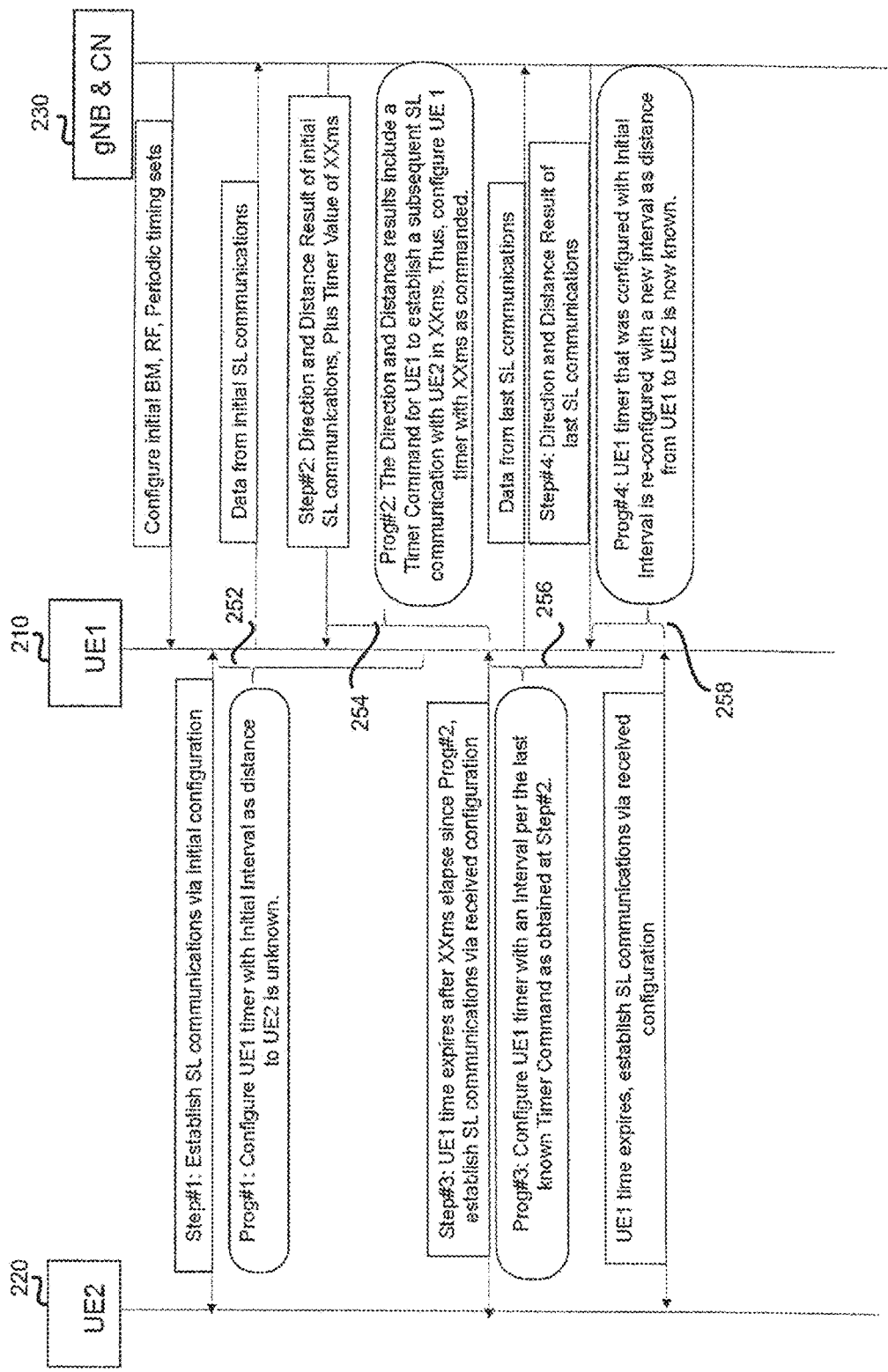
FIG. 2B illustrates example implementation for performing a ranging process and determining a time interval for performing a subsequent ranging process, according to an example implementation of the present application.
Figure 2C:
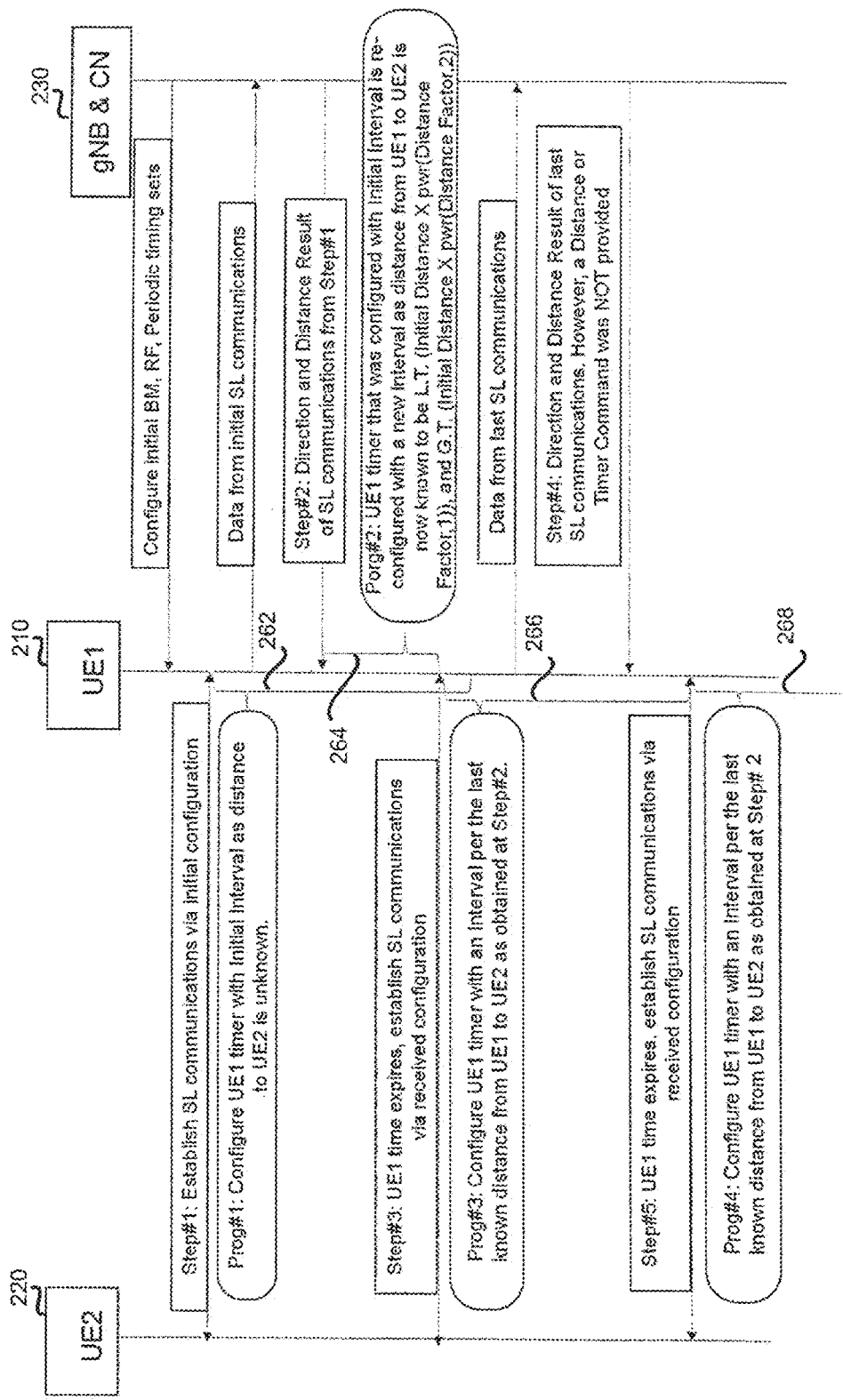
FIG. 2C illustrates example implementation for performing a ranging process and determining a time interval for performing a subsequent ranging process, according to an example implementation of the present application.

FIGS. 2A-2C illustrate example implementations for performing a ranging process and determining a time interval for performing a subsequent ranging process, according to an example implementation of the present application. The diagrams shown in FIGS. 2A-2C include a first UE 210 (UE1), a second UE 220 (UE2), and a serving base station 230 (among other network entities) that communicate with each other, and with other network entities, at different points of time. In the example shown in FIG. 2A, two direction and distance determinations are made and four programmings (or ranging processes) of the Interval Timer are made.

The first programming, as described below, is for determining an Initial Interval. The second programming is a correction to account for a new distance identified from UE 210 to UE 220, such that they may now be less than a first distance apart (e.g., a threshold equal to Initial Distance multiplied by Distance Factor), but still greater than a second distance apart (e.g., a threshold equal to Initial Distance multiplied by Distance Factor squared). The third programming is for programming the Interval as related to a distance from UE 210 to UE 220, as known in the second programming. Finally, the fourth programming is a correction to account for a change in the distance from UE 210 to UE 220, such that they are now less than the second distance apart, but still greater than a third distance apart (e.g., a threshold equal to Initial Distance multiplied by Distance Factor cubed).

As shown in FIG. 2A, base station 230 may configure the first UE 210 with initial SL configuration data that may include BM, RF, and periodic timing sets, for example, as indicated in the initial resource set of the SL configuration. At Step #1, the first UE 210 may establish an initial SL communication channel with the second UE 220 based on the initial SL configuration it has received from base station 230. Following performing the first direction and distance determination operation (after Step #1), the Interval Timer may be configured (at Prog #1) with the Initial Interval, as the distance from UE 210 to UE 220 is still not known by UE 210. As such, the first interval timer may be set to time interval 242.

Next, UE 210 may send data related to the established SL channel to base station 230. As will be described in more detail below, the related data may include a resource set unique ID, a beam index, and QoS associated with the established connection, among other data. Based on the received information, base station 230 (e.g., a gNB) may return (at Step #2) the first direction and distance that are the result of the initial SL communication (from Step #1) to UE 210. As shown in FIG. 2A, the message received from the base station may include at least a new distance from UE 210 to UE 220. As such, since the new distance from UE 210 to UE 220 (now known by UE 210) may indicate that the UEs are less than a first distance (e.g., Initial Distance multiplied by Distance Factor) apart, but still greater than a second distance (e.g., Initial Distance multiplied by Distance Factor squared) apart, UE 210 may reconfigure the Interval Timer (at Prog #2) to a new time interval 244. As shown, the new Time Interval 244 is less than Time Interval 242, which was previously calculated (in Prog #1).

When the Interval Timer that reflects Time Interval 244 expires (at Step #3), the second direction and distance determination operation (e.g., ranging process) may start and a new Interval Timer may be configured (at Prog #3) with an Interval Time 246, as related to the new distance from UE 210 to UE 220. Additionally, as shown in the figure, when the last timer (set by Prog #2) is expired (e.g., after interval time 244), first UE 210 may attempt to establish a second SL channel with the second UE 220 based on configuration (e.g., a resource set) received from base station 230 (e.g., in Step #2). It should be noted that, as shown in the figure, even though the initial time interval 242 was still not expired, since the newly calculated time interval 244 is expired, UE 210 may initiate a new SL connection with UE 220 (e.g., irrespective of the status of time interval 242 being expired or not). After calculating time interval 246, UE 210 may send data associated with the second SL connection to base station 230 (e.g., right after the new timer is set or before setting the new timer).

When base station 230 returns the results (e.g., the second direction and distance) of the last SL communication (at Step #4), since the distance from UE 210 to UE 220 is now known by UE 210 (e.g., to be less than (Initial Distance multiplied by Distance Factor squared) apart, but still greater than (Initial Distance multiplied by Distance Factor cubed) apart), the Interval Timer may be reconfigured (at Prog #4) again, for example, to reflect a new interval Time 248 which may be shorter than the previous Interval Time 246 (e.g., calculated in Prog #3) and may expire before the previous timer expires. As shown in the figure, when the last timer set by Prog #4 is expired (e.g., after interval time 248), first UE 210 may attempt (at Step #5) to establish a third SL channel with the second UE 220 based on configuration (e.g., a resource set) received from base station 230 (e.g., in Step #4).

In the example shown in FIG. 2B, two direction and distance determinations and four programmings of the Interval Timer are made, with the first programming being for determining an Initial Interval, the 2nd programming being a timer value, as commanded by the NR V2X Control Function, for example, based on the results returned from the first direction and distance determination, the 3 rd programming being a reuse of the timer value as commanded by the NR V2X Control Function at Step #2, and the forth programming being a timer value as commanded by the NR V2X Control Function based on the results returned from the second direction and distance determination.

With reference to FIG. 2B, base station 230 may configure the first UE 210 with initial SL configuration data that may include BM, RF, and periodic timing sets, for example, as indicated in the initial resource set of the SL configuration. At Step #1, the first UE 210 may establish an initial SL communication channel with the second UE 220 based on the initial SL configuration it has received from base station 230. Following performing the first direction and distance determination operation (after Step #1), the Interval Timer may be configured (at Prog #1) with the Initial Interval, as the distance from UE 210 to UE 220 is still not known by UE 210. As such, the first interval timer may be set to time interval 252.

Next, UE 210 may send data related to the established SL channel to base station 230. As will be described in more detail below, the related data may include a resource set unique ID, a beam index, and QoS associated with the established connection, among other data. Based on the received information, base station 230 (e.g., a gNB) may return (at Step #2) the first direction and distance that are the result of the initial SL communication (from Step #1) to UE 210. As shown in the figure, the message received from the base station may include at least a new distance from UE 210 to UE 220, as well as a command for UE 210 to configure the Interval Timer with an overriding time (e.g., having a value of XX ms). As such, UE 210 may set the Interval Timer (at Prog #2) to overriding time 254 as commanded by base station 230. It should be noted that this is a configuration of Interval Timer and not a reconfiguration that may have otherwise taken into account the time elapsed since the configuration at Prog #1.

When the Interval Timer expires (at Step #3), the second direction and distance determination operation may begin and the Interval Timer may be configured (at Prog #3) with a new interval time 256 which is a reuse of timer value 254, as commanded by the NR V2X Control Function in the previous step (Step #2). Additionally, as shown in the figure, when the last timer (set by Prog #2) is expired (e.g., after interval time 254), first UE 210 may attempt to establish a second SL channel with second UE 220 based on configuration (e.g., a resource set) received from base station 230 (e.g., in Step #2). It should be noted that, as shown in the figure, even though the initial time interval 252 was still not expired, since the newly commanded time interval 254 is expired, UE 210 may initiate a new SL connection with UE 220 (e.g., irrespective of the status of time interval 242 being expired or not). After setting time interval 256 (e.g., by reusing the commanded time interval 254), UE 210 may send data associated with the second SL connection to base station 230 (e.g., right after the new timer is set or before setting the new timer).

When base station 230 returns the results (e.g., the second direction and distance) of the last SL communication (at Step #4), since the distance from UE 210 to UE 220 is now known by UE 210 (e.g., to be less than (Initial Distance multiplied by Distance Factor squared) apart, but still greater than (Initial Distance multiplied by Distance Factor cubed) apart), the Interval Timer may be reconfigured (at Prog #4), for example, to reflect a new interval Time 258, which may be longer than the previous Interval Time 256 (e.g., calculated in Prog #3) and may expire after the previous timer expires. As shown in the figure, when the last timer set by Prog #4 is expired (e.g., after interval time 258), first UE 210 may attempt to establish a third SL channel with the second UE 220 based on configuration (e.g., a resource set) received from base station 230 (e.g., in Step #4).

In the example shown in FIG. 2C, three direction and distance determinations and four programmings of the Interval Timer are made, with the first programming being a programming of the Initial Interval, the second programming being a correction to account for the distance from UE 210 to UE 220, such that they are now less than a first distance (e.g., a threshold equal to Initial Distance multiplied by Distance Factor) apart, but still greater than apart (e.g., a threshold equal to Initial Distance multiplied by Distance Factor squared) apart, the third programming for calculating the Interval as related to the distance from UE 210 to UE 220 as known at the second programming, and the fourth programming also being for identifying the Interval as being related to the distance from UE 210 to UE 220 as known at the second programming as the NR V2X Control Function has yet to return a Distance Result of the direction and distance determination operation from Step #4.

With reference to FIG. 2C, base station 230 may configure the first UE 210 with initial SL configuration data that may include BM, RF, and periodic timing sets, for example, as indicated in the initial resource set of the SL configuration. At Step #1, the first UE 210 may establish an initial SL communication channel with the second UE 220 based on the initial SL configuration it has received from base station 230. Following performing the first direction and distance determination operation (after Step #1), the Interval Timer may be configured (at Prog #1) with the Initial Interval, as the distance from UE 210 to UE 220 is still not known by UE 210. As such, the first interval timer may be set to time interval 262.

Next, UE 210 may send data related to the established SL channel to base station 230. Based on the received information, base station 230 may return (at Step #2) the first direction and distance that are the result of the initial SL communication (from Step #1) to UE 210. As shown in the figure, the message received from the base station may include at least a new distance from UE 210 to UE 220. As such, since the new distance from UE 210 to UE 220 (now known by UE 210) may indicate that the UEs are less than a first distance (e.g., Initial Distance multiplied by Distance Factor) apart, but still greater than a second distance (e.g., Initial Distance multiplied by Distance Factor squared) apart, UE 210 may reconfigure the Interval Timer (at Prog #2) to a new time interval 264. As shown, the new Time Interval 264 is less than Time Interval 262, which was previously calculated (in Prog #1).

When the Interval Timer that reflects Time Interval 264 expires (at Step #3), the second direction and distance determination operation (e.g., ranging process) may start and a new Interval Timer may be configured (at Prog #3) with an Interval Time 266, as related to the new distance from UE 210 to UE 220. Additionally, as shown in the figure, when the last timer (set by Prog #2) is expired (e.g., after interval time 264), first UE 210 may attempt to establish a second SL channel with the second UE 220 based on configuration (e.g., a resource set) received from base station 230 (e.g., in Step #2). It should be noted that, as shown in the figure, even though the initial time interval 262 was still not expired, since the newly calculated time interval 264 is expired, UE 210 may initiate a new SL connection with UE 220 (e.g., irrespective of the status of time interval 262 being expired or not). After calculating time interval 266, UE 210 may send data associated with the second SL connection to base station 230 (e.g., right after the new timer is set or before setting the new timer).

As shown in FIG. 2C, however, when base station 230 returns the results (e.g., the second direction and distance) of the last SL communication to UE 210 (at Step #4), the base station (e.g., the NR V2X Control Function) may not return a Timer Command or Distance Result of the direction and distance determination operation from Step #3. As such, when the Interval Timer associated with time interval 266 expires (at Step #5), the third direction and distance determination operation may begin and the Interval Timer may be configured (at Porg #4) with a time Interval as related to the distance from UE1 to UE2, as known at the second programming (or Step #2). That is, in some implementations, if the resource set received from the base station does not indicate a new distance, nor does it indicate an overriding time interval value (e.g., an interval command), the first UE may use the previously set timer as the new timer (e.g., not change the previously used time interval).

FIGS. 3A, 3B, 3C, and 3D illustrate a flowchart of a ranging method/process performed by a first UE (e.g., an NR UE) for determining relative distance and direction between the first UE and a second UE (e.g., another NR UE) when at least the first UE is out of network coverage in accordance with an example implementation of the present application.

In one or more implementations of the present disclosure, the ranging process may use a ranging configuration resource set (hereinafter "resource set") provided by a Network V2X Control Function (e.g., an NR V2X Control Function) to configure the physical layer of a UE's (e.g., the first UE's) SL channel. The NR V2X Control Function may provide to the first UE's ranging mechanism a plurality of resource sets, whereby the first (or initial) resource set may be followed by one or more subsequent resource sets and the delivery of a subsequent resource set may be dependent upon a determination made by the NR V2X Control Function regarding the results of the direction ranging process per the use of the initial (or previous) resource set.

The ranging method may begin by the first UE informing the NR V2X Control Function about the capabilities of the first UE with respect to the first UE's ability to support a ranging procedure and providing to the NR V2X Control Function the default values describing how the first UE's antennas are configured with respect to their orientation to the UE's display.

Figure 3A:
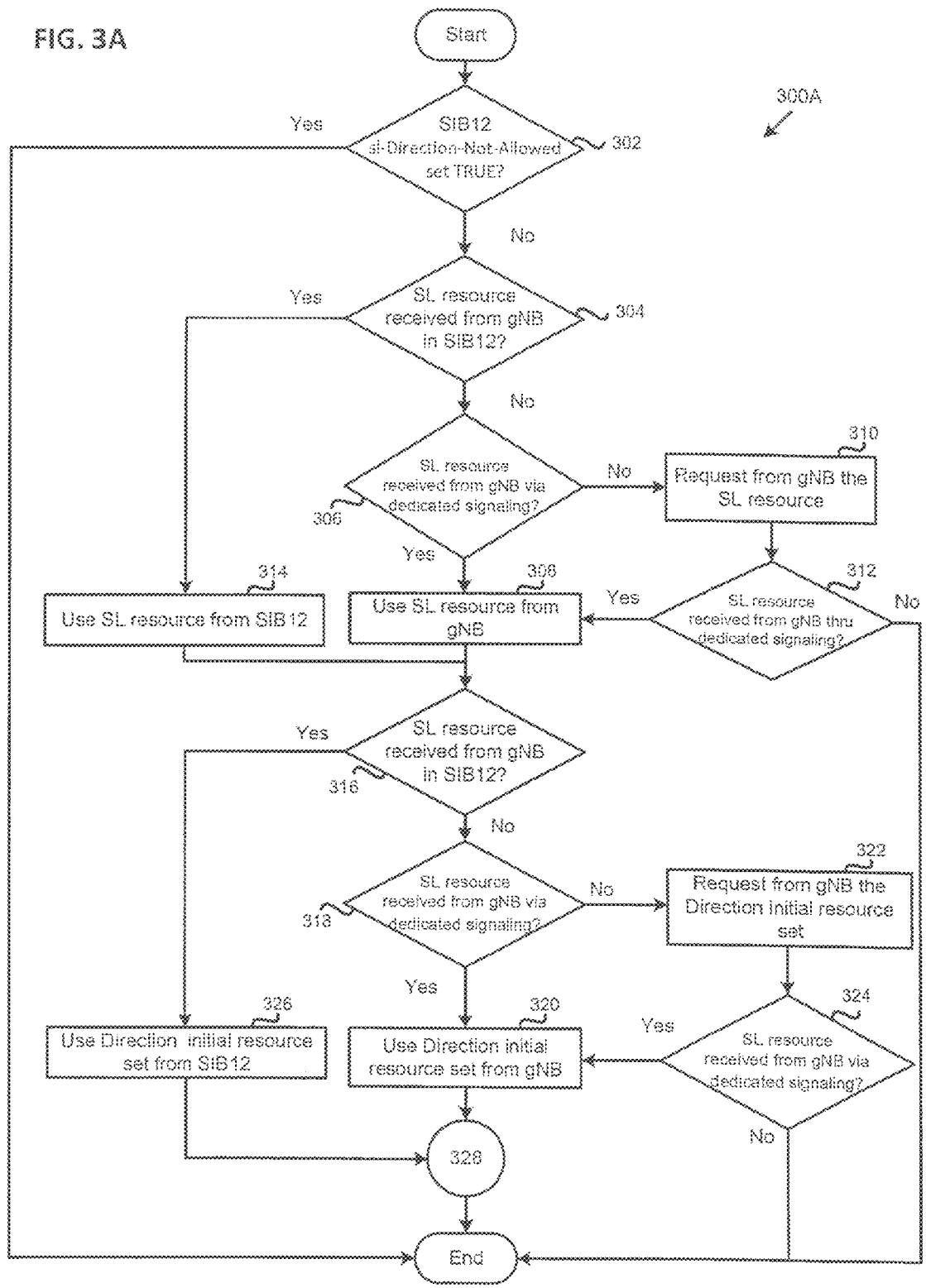
FIG. 3A illustrates flowchart of a ranging method/process by a first UE for determining relative distance and direction from the first UE to a second UE when at least the first UE is within the network coverage, according to an example implementation of the present application.

In FIG. 3A, in action 302 of the flowchart 300A, the first UE determines whether a directional ranging bit is configured in a System Information Block 12 (SIB12) broadcast by a base station (e.g., a gNB) to enable the first UE to use a preconfigured initial resource set for SL direction operation. For example, when an "sl-Direction-Not-Allowed" bit in the SIB12 is set to be TRUE, then the first UE is not allowed to perform SL direction operations. Thus, the ranging method ends. When the "sl-Direction-Not-Allowed" bit in the SIB12 is set to be FALSE, then the first UE is allowed to perform SL direction operations and the flowchart 300A proceeds to action 304.

In action 304, the first UE determines whether any SL resources are received from the base station (e.g., a gNB) in the SIB12. If at least one SL resource is received from the base station in the SIB12, the flowchart proceeds to action 314 where the first UE will use the SL resource indicated in the SIB12 for the subsequent actions. In one implementation, the base station may provide the SL resource via information elements SL-DirConfigCommon-r17 carried by the SIB12 broadcast by the base station. On the other hand, if no SL resource is received from the SIB12, the flowchart 300A proceeds to action 306.

In action 306, the first UE determines whether any SL resources are received from the base station via dedicated signaling. If at least one SL resource is received from the base station via dedicated signaling (e.g., via an RRCReconfiguration message), the flowchart 300A proceeds to action 308 where the first UE will use the SL resource received from the base station for the subsequent actions. In one implementation, the base station may provide the SL resource via information elements SL-DirConfigDedicated-r17 carried by a Radio Resource Control (RRC) reconfiguration (RRCReconfiguration) message. On the other hand, if no SL resource is received from the base station via dedicated signaling, the flowchart 300A proceeds to action 310.

In action 310, the first UE requests SL resources from the base station via dedicated signaling. In action 312, after making the request, the first UE determines whether any SL resources are received from the base station via dedicated signaling (e.g., an RRC message). If at least one SL resource is received from the base station via dedicated signaling, the flowchart 300A proceeds to action 308 where the first UE will use the SL resource indicated in the dedicated signaling for the subsequent actions. If no SL resource is received from the base station in action 312, then the ranging method ends. In one implementation, the base station may provide the SL resource via information elements SL-DirConfigDedicated-r17 carried by an RRCReconfiguration message.

In action 316, the first UE determines whether an initial resource set (e.g., a Direction initial resource set) is received from the base station in the SIB12. If an initial resource set is received in the SIB12, then the flowchart proceeds to action 326 where the first UE uses the initial resource set from SIB12 for the subsequent actions. If a direction initial resource set is not received in the SIB12, then the flowchart proceeds to action 318.

In action 318, the first UE determines whether an initial resource set is received from the base station. If an initial resource set is received from the base station, then the flowchart proceeds to action 320 where the first UE uses the initial resource set from the base station for the subsequent actions. If an initial resource set is not received from the base station, then the flowchart proceeds to action 322.

In action 322, the first UE requests an initial resource set from the base station via dedicated signaling.

In action 324, after making the request, the first UE determines whether an initial resource set is received from the base station via dedicated signaling (e.g., an RRC message). If an initial resource set is received from the base station via dedicated signaling, then the flowchart proceeds to action 320 where the first UE will use the initial resource set from the base station for the subsequent actions. In one implementation, the base station may provide the SL resource via information elements SL-DirConfigDedicated-r17 carried by an RRCReconfiguration message. If an initial resource set is not received from the base station in action 324, then the ranging method ends.

In various implementations of the present disclosure, the Network V2X Control Function provides to the first UE a set of NR SL resources and Beam Management parameters for use in determining a direction from the first UE to the second UE. The NR SL resources and Beam Management parameters provided by the Network V2X Control Function are aggregated into a logical grouping called a "Direction resource set" or "resource set". Associated with each resource set are: a unique identifier (ID) of the Direction resource set, parameters enabling a specific set of directional Tx beams, a unique index for each directional Tx beam, parameters for configuring an NR V2X Resource Pool. The Network V2X Control Function may provide the first UE with a plurality of resource sets. In various implementations of the present disclosure, the first UE may trigger an initial configuration of the SL physical layer with an initial resource set, and then any determined reconfiguring of the physical layer with one or more subsequent resource sets. FIG. 4 illustrates contents of example resource sets configured by the Network V2X Control Function.

Upon receiving the initial resource set (either via SIB12 in action 326 or via dedicated signaling in action 320), the ranging method proceeds to action 328 in the flowchart 300B in FIG. 3B.

Referring to FIG. 3B, in action 330, the first UE may inform the Network V2X Control Function that the first UE is capable of a ranging function using the SL channel in combination with a Beam Management process. For example, the first UE may provide to the NR V2X Control Function, an indication that the first UE is capable of a ranging function using an SL channel in combination with a BM process, the Ranging function resolving a direction and an inclination from the first UE to the second UE. The indication may include the maximum number of array elements of each antenna used by the first UE, the frequency range of each antenna used by the first UE, and the number of antennas used by the first UE.

In action 332, the first UE may configure the V2X resource selection function with a normal SL resource. In action 334, the first UE may trigger an SL discovery to find other UEs. In action 336, the first UE determines whether the SL discovery found other UEs. If the SL discovery found other UEs in action 336, the flowchart 300B proceeds to action 338. In action 338, the first UE determines whether the desired second UE is one of the other UEs found during the SL discovery. If the SL discovery did not find any other UEs in action 336, the flowchart 300B proceeds to return to the flowchart 300A and the direction ranging method ends.

In action 338, if the desired second UE is one of the other UEs found during the SL discovery, then the flowchart 300B proceeds to action 340. If the desired second UE is not one of the other UEs found during the SL discovery, then the flowchart 300B proceeds to return to the flowchart 300A and the direction ranging method ends.

In action 340, the first UE determines whether it is possible to attempt a direction ranging process from the first UE to the second UE. For example, the first UE may attempt to establish an SL connection to the second UE using a standard SL configuration so as to determine if a ranging process is possible and/or desired. If it is possible to attempt a direction ranging process from the first UE to the second UE, then the flowchart 300B proceeds to action 342 in the flowchart 300C in FIG. 3C to establish an SL connection from the first UE to the second UE using the initial ranging configuration resource set. If it is not possible to attempt a direction ranging process from the first UE to the second UE, then the flowchart 300B proceeds to return to the flowchart 300A and the direction ranging method ends.

Referring to FIG. 3C, a distance may be set to unknown in action 344 and a 3-Tuple field or parameter of [Resource set unique ID, Beam Index, QoS] may be set to NULL in action 346. This is because the first time the ranging process is running no distance or 3-tuple parameter is yet known.

In action 348, the current resource set may be initialized with the initial (distance and direction) resource set. In action 350, the first UE may be configured (e.g., the V2X Resource selection function may be configured) with the resource set (which, for the first time, may be the initial resource set). For example, the first UE may configure an SL communication channel with the initial resource set having the V2X resource pools and associated BM configurations.

In action 351, the first UE triggers an SL connection from the first UE to the second UE. For example, the first UE may attempt to establish an SL communication link with the second UE via the configurations provided by the initial resource set.

The first UE may map each of the set of directional transmission beams used for establishing the SL connection to a beam index. Each Beam Index of the initial resource set represents a specific Tx beam, where each Tx beam radiates from an antenna in a specific direction. The direction of a Tx beam may be mapped to a horizontal plane as a plane of reference that is centered on the first UE's transmitting antenna, whereby each Tx beam may be associated with a azimuth in degrees (or radians or grads.), and the azimuths represent an angle from zero to 359 degrees in the reference plane that is oriented 90 degrees to the antenna as a di-pole (e.g., each azimuth represents bearings in a horizontal plane of reference (the X-Y plane) relative to the antenna's Z-axis). A beam's azimuth is assigned such that there is a relationship to the physical orientation of the antenna in the first UE.

Additionally, each Tx beam may be associated with a zenith angle in degrees (or radians or grads.) that are centered on the first UE's transmitting antenna, and the zenith angle may range from 0-180 degrees (i.e., the zenith represents a bearing in a vertical plane of reference, where 0 degrees is vertically up, 90 degrees is horizontal, and 180 degrees is vertically down). Alternately, an altitude angle in degrees (or radians or grads.) from +90 to -90 degrees can be used that spans from vertically up to vertically down. The plane of the zenith bisects the plane of the azimuth and shares the same origin as the azimuth, such that a zenith is aligned, and related, to an azimuth.

In one implementation of the present disclosure, only the azimuth is considered. If the first UE is oriented such that its user interface (UI) display is in the horizontal plane, a first beam may be assigned an azimuth such that it relates to a bearing out of the top of the UE (e.g., 0 degrees), a second beam may be assigned to an azimuth such that it relates to a bearing out the right side of the first UE (e.g., 90 degrees), a third beam may be assigned to an azimuth such that it relates to a bearing out the bottom (e.g., 180 degrees), a fourth beam may be assigned to an azimuth such that it relates to a bearing out the left side (e.g., 270 degrees).

In another implementation of the present disclosure, zenith and azimuth are considered. A first beam may be assigned zenith of 30 degrees and is aligned to an azimuth of 0 degrees, a second beam may be assigned an zenith that relates to 90 degrees and is aligned to an azimuth 90 degrees, a third beam may be assigned an zenith that relates to 120 degrees and is aligned to an azimuth of 180 degrees, a fourth beam may be assigned a zenith that relates to 90 degrees and is aligned to an azimuth of 270 degrees.

In various implementations of the present disclosure, the relationship that maps azimuth and zenith to an antenna's physical or electronic orientation on a UE is known to the Network V2X Control Function and the UEs application layer. The number of beams is dependent on the configuration.

In various implementations of the present disclosure, the physical mounting of the antenna in the first UE can be associated to default reference planes. The default value many have been configured at time of manufacture, or the default values may be an electronic interpretation of the antenna's orientation relative the first UE's body that is computed by the microcontroller on the first UE. For example, the antenna could be mounted such that the antenna's electronic X-Y plane is in the same reference plane as the screen (e.g., front and back side) of the first UE, and the antenna's electronic X-Z plane is in the same reference plane as the top and bottom of the first UE, and the antenna's electronic Z-Y plane is in the same reference plane as the left and right side of the first UE.

It can be envisioned that the NR V2X enabled UE may have embedded in its hardware a 2-axis orientation sensor capable of continuously measuring: pitch (rotation about the X-axis), and roll (rotation about the Y-axis).

Figure 5:
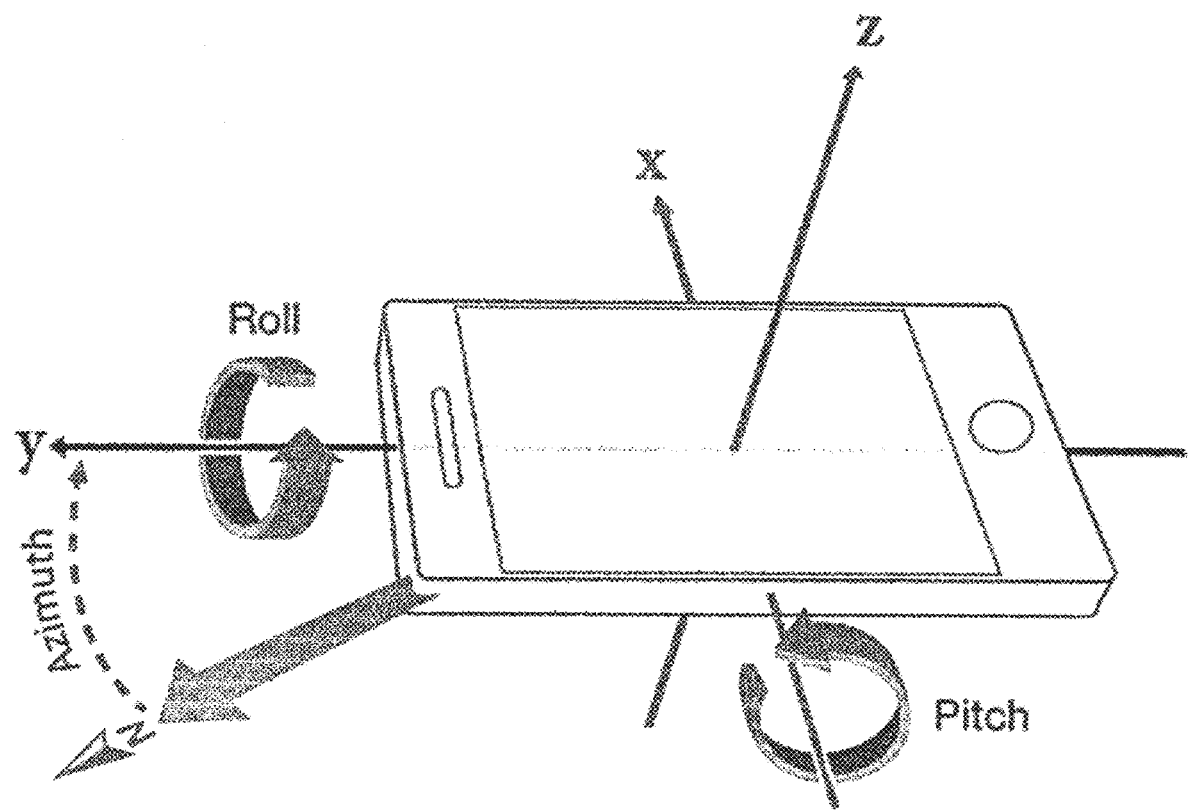
FIG. 5 illustrates an example of an orientation of a handset body in relation to X, Y and Z axis and their relationship front, top and side, and the relationship to Pitch, Roll and Yaw, according to an example implementation of the present application.

In various implementations of the present disclosure, the first UE is an NR V2X enabled UE that has embedded in its hardware a compass for detecting magnetic North (e.g., a Flux-gate compass), which can be used to measure the yaw (rotation about the Z-axis) of the handset relative to some point indicated by the compass (e.g., the azimuth from magnetic North). FIG. 5 illustrates an example of an orientation of the handset body in relation to X, Y and Z axis and their relationship front, top and side, and the relationship to Pitch, Roll and Yaw.

In various implementations of the present disclosure, the first UE is capable of assisting the Network V2X Control Function in determining the relative direction between the first UE and the second UE using SL communication channel and Beam Management.

The first UE has specific default values for each of its antennas that can be used for direction determination:
 a maximum number of array elements of each antenna used by the first UE;
 a frequency range of each antenna used by the first UE;
 a number of antennas used by the first UE;
 orientation of an antenna array axis and antenna transmission centered to a default direction in the horizontal plane of reference (e.g., a value that equates to 0 degrees in the horizontal plane would equate to a beam that radiates out the top of the device);
 orientation of an antenna array axis and antenna transmission centered to a default direction in the vertical plane of reference.

FIG. 6 illustrates an example of a UE capability indication in accordance with an implementation of the present disclosure.

In action 352, the first UE may determine whether an SL connection from the first UE to the second UE is established. If an SL connection from the first UE to the second UE is established, the method may loop back until it determines that a sidelink channel between the first and second UEs is established. If the method determines that an SL connection from the first UE to the second UE is established, the first UE may determine, in action 353, the beam index identifying the beam of the first set of directional transmission beams the second UE has chosen to establish the SL connection.

The second UE may provide to the first UE information (e.g., an indication) that can assist the first UE to identify the specific beam the second UE has chosen to establish the SL connection (from a plurality of beams transmitted by the first UE and received by the second UE). In one implementation, the second UE may provide such information via a PRACH procedure (e.g., the PRACH location in time identifies the beam that the second UE used to establish the connection to the first UE).

In action 354, the first UE may receive a Quality of Service (QoS) value associated with the first beam of the first set of directional transmission beams used for establishing the first SL connection. For example, the second UE may report to the first UE information about the radio frequency (RF) state of the direction determination SL connection between the first UE and the second UE (e.g., the QoS value of the specific beam as received by the second UE) via the PRACH procedure. It should be understood that, in various implementations of the present disclosure, the QoS value associated with the beam chosen by the second UE may be generated based on at least the QoS Sustainability Analytics, which may include radio channel measurements and/or conditions, such as RSRQ (Reference Signal Received Quality), RSRP (Reference Signal Received Power), CQI (Channel Quality Indicator), and other analytics such as frame error rate.

In action 355, the first UE configures the 3-Tuple of [Resource set unique ID, Beam Index, QoS], where the "resource set unique ID" is the ID of the resource set used to establish the SL connection, the "beam index" is the beam chosen by the second UE to establish the SL connection with the first UE, and the "QoS" is the QoS value associated with the chosen beam.

In action 356, the first UE sends the 3-Tuple to the Network V2X Control Function. For example, the first UE may report the results of the beam selection, the resource set used, and the QoS value of the selected beam to the Network V2X Control Function via the 3-tuple parameter [Resource set unique ID, Beam Index, QoS]. The method may then proceed to action 368 to determine a time interval, which is described in detail below, with reference to FIG. 3D.

The Network V2X Control Function may make a distance and direction determination from the first UE to the second UE based on the first UE's capabilities (e.g., antenna configuration and antenna array elements and default values for relating its antenna array orientation and antenna transmissions to a default direction in a default reference plane), the unique ID of the resource set used by the first UE to generate the beam, the unique index of the beam used to establish the SL connection, and the QoS of the beam as received by the second UE.

In action 357, the first UE may determine whether the Network V2X Control Function has sent back a SL-DirConfigDedicated-r17. The NR V2X Control Function may either return to the first UE a direction to the second UE (i.e., the Direction Result), or another direction ranging configuration that the first UE will use to do a subsequent direction ranging operation with the second UE. If no such a parameter is sent back, the UE may determine, in action 358, whether there is a time out. If the UE determines that there is a time out, the process may return to flowchart 300B, otherwise the process loops back to determine whether the SL-DirConfigDedicated-r17 is received. The SL-DirConfigDedicated-r17 IE, is some embodiments, may be carried by the RRCReconfiguration message and may contain the parameters for 'Direction' and 'Distance' from the first UE to the second UE as determined by the Network V2X Control Function (e.g., as based on the data the Control Function receives from an initial directional determination operation performed by the first UE).

If the network sends the parameter or a direction result, based on the results of the initial directional determination operation, the Network V2X Control Function may make a determination on the beam used to establish the SL connection is an optimal beam for SL communication from the first UE to the second UE (e.g., for the purpose of ranging direction determination from the first UE to the second UE). If the beam is determined to be optimal, the Network V2X Control Function may provide a direction result to the first UE, indicating to the first UE that additional directional determination operation is not necessary. In some implementations, the Network V2X Control Function may make such indication by not providing any more information to the UE relating to the distance and/or direction, at which case the time-out may occur (e.g., as shown in action 358).

After determining that the first UE has received the SL-DirConfigDedicated-r17, in action 360, the first UE may determine whether the Network V2X Control Function has sent back a subsequent resource set. For example, if the Network V2X Control Function determines that the beam used to establish the SL connection is not an optimal beam for SL communication from the first UE to the second UE (e.g., for the purpose of ranging direction determination from the first UE to the second UE), the Network V2X Control Function may configure a subsequent resource set to the first UE for establish another SL connection from the first UE to the second UE. If the Network V2X Control Function has not sent back a subsequent resource set, then the method proceeds to action 364, otherwise, the current resource set is set to be the received subsequent resource set in action 362.

In action 364, the first UE may determine whether the control function has sent back a distance (e.g., for calculating a new time interval) or a timer command (e.g., for an overriding time interval). As described above, the distance and timer command may be indicated (e.g., as one or more parameters) in the (subsequent) resource set that is received from the network. If the first UE determines that either of the distance or timer command is received from the network, the method proceeds to action 368 which is described below with reference to FIG. 3D. On the other hand, the method may determine, in action 366, whether the current interval timer (e.g., received from flowchart 300D) has expired. After the interval timer is expired, the method may loop back to action 350 to configure the first UE (e.g., the V2X Resource selection function) with the current resource set (which might have been received from the network as a subsequent resource set). Based on the current resource set and after the time interval has expired, the first UE may initiate a new SL communication channel with the second UE.

As described above, some aspects of the present implementations provide a ranging method/process for determining the periodicity of sidelink channel communications between two UEs when at least one of the UEs is within the network coverage. In some implementations, after initiating an attempt to establish a sidelink communication link with a second UE, the first UE may configure a timer (e.g., an interval timer) with a value that when expired, indicates that the first UE should make a subsequent attempt to establish a sidelink communications link with the second UE. The value used to configure the timer may be a default value provided by a cell of a base stations (e.g., an NR V2X Control Function associated with the cell), or a value calculated by the first UE based on a distance identified (e.g., by the network) between the first and second UEs. The distance may be determined by the network from data that is received from the first UE and that is associated with a previous sidelink communication established between the first UE and the second UE. For example, the distance may be determined based on at least a QoS value reported by the second UE to the First UE as related to the quality of the sidelink RF connection.

While a timer associated with the determined time interval is running, a new sidelink connection to the second UE may not be established, for example, for the purpose of determining the beam selected by the second UE to establish the connection, and a distance from the first UE to the second UE.

In various implementations of the present application, the first UE may determine the value of the timer based on the results of an algorithm that is used by the first UE. The algorithm may be configured by a set of one or more parameters that are, for example, provided by the NR V2X control function via SIB or RRC reconfiguration message in addition to a distance (and/or one or more factors of the distance) parameter that represents the distance from the first UE to the second UE (e.g., as determined by the first UE). The set of one or more parameters (e.g., provided by the NR V2X control function via RRC or SIB) for the algorithm may include an initial interval, an interval factor, an initial distance, a distance factor, a repetition factor/number (e.g., Max N Factor parameter), and the distance to the second UE.

In some implementations of the present application, instead of the first UE determining the value that is used to configure the interval timer, the value may be determined based on the presence of a predetermined value provided, for example, by the Control Function (e.g., via SIB or RRC reconfiguration message). In some implementations, the predetermined value may be referred to as a Timer Command. In some such implementations, if the first UE receives the Timer Command value, it may override any time interval calculated by the first UE.

The above described algorithm used by the first UE for determining the time intervals may be represented by the following pseudo code:

```
N = 0;
Do {
    If (N >= Max_N_Factor) {
        Output = (Initial_Interval x pow (Interval_Factor, N))
        break
    }
    If (Distance > (Initial_Distance x pow(Distance_Factor, N)){
        Output = (Initial_Interval x pow (Interval_Factor, N))
        break
    }
    N = N+1
While (True)}
Timer = Output
```

The parameters used for configuring the above algorithm are now described. The Initial Interval parameter is a default value and may be used as a starting value upon the first iteration of the algorithm. The Initial Interval value, or an adjustment to the Initial Interval value, may be output by the algorithm and subsequently used to configure the interval timer. The algorithm may output the Initial Interval value when the distance parameter is unknown or when the distance parameter is greater than a threshold (e.g., greater than the Initial Distance parameter). The algorithm may output an adjustment to the Initial Interval value as effected by a first application of the Interval Factor when the distance parameter is greater than the Initial Distance parameter, as effected by the first application of the Distance Factor. The algorithm may output an adjustment to the Initial Interval value as effected by applying iterations of the Interval Factor when the Distance parameter is greater than the Initial Distance parameter as effected by an equivalent number of iterations of the Distance Factor.

The Interval Factor parameter is used by the algorithm to adjust the value of the Initial Interval upon each iteration of the algorithm. The algorithm may continue its iterations and adjustments to the Initial Interval value by applying the Interval Factor until the Distance parameter is greater than the Initial Distance parameter as may be modified by the Distance Factor.

The Initial Distance parameter is a default value and may be used as a starting value upon the first iteration of the algorithm. The Initial Distance value, or an adjustment to the Initial Distance value, may be used to control the iterations of the algorithm. The algorithm may iterate upon the Initial Distance value when the Distance parameter is greater than the Initial Distance parameter. The algorithm may iterate upon an adjustment to the Initial Distance value as effected by a first application of the Distance Factor when the Distance parameter is greater than the Initial Distance parameter, as effected by the first application of the Distance Factor. The algorithm may iterate upon an adjustment to the Initial Distance value as effected by applying iterations of the Distance Factor when the Distance parameter is greater than the Initial Distance parameter, as effected by an equivalent number of iterations of the Distance Factor. The algorithm may stop the iterations upon an adjustment to the Initial Distance value, as effected by applying iterations of the Distance Factor when the Distance parameter is less than the Initial Distance parameter, as effected by an equivalent number of iterations of the Distance Factor.

The Distance Factor parameter is used by the algorithm to adjust the value of the Initial Distance upon each iteration of the algorithm. The algorithm may continue its iterations and adjustments to the Initial Distance value by applying the Distance Factor until the Distance parameter is greater than the Initial Distance parameter as may be modified by the Distance Factor.

The Max N Factor is used by the algorithm to set the maximum number of iterations that the algorithm may execute, and as such may define the minimum interval timer value that the algorithm may output.

The Timer Command Value is a parameter that when is configured to a non-zero value, it may override the operations of the algorithm and as such may always result in setting the interval timer to the non-zero value contained therein.

The Distance parameter represents the distance from the first UE to the second UE, as determined from distance and direction measurements taken by the first UE. The distance and direction measurements taken by the first UE may have been previously sent to the NR V2X Control Function, and the NR V2X Control Function may then have determined the distance between the two UEs, for example, based on the distance and direction measurements. The identified distance may then be provided to the first UE by the Distance parameter. This parameter may be used by the above described algorithm to compare against the value of the Initial Distance upon each iteration of the algorithm. The algorithm may continue its iterations and comparisons of the Distance parameter with the Initial Distance value until the Distance parameter is greater than the Initial Distance parameter, as may be modified by the Distance Factor at each iteration of the algorithm.

The above described parameters are also shown in FIG. 4 as part of the contents of a plurality of ordered resource sets that are, for example, configured by the (Network V2X) Control Function. As shown in FIG. 4, each resource set in the plurality of resource sets includes all of the above described parameters with each one having a particular value(s). It should be noted, however, that even though all of the example resource sets illustrated in FIG. 4 include the interval parameters, in some implementations, only one of the resource sets (e.g., the initial resource set) may include these parameters and the other resource sets do not include the time interval parameters.

Figure 3D:
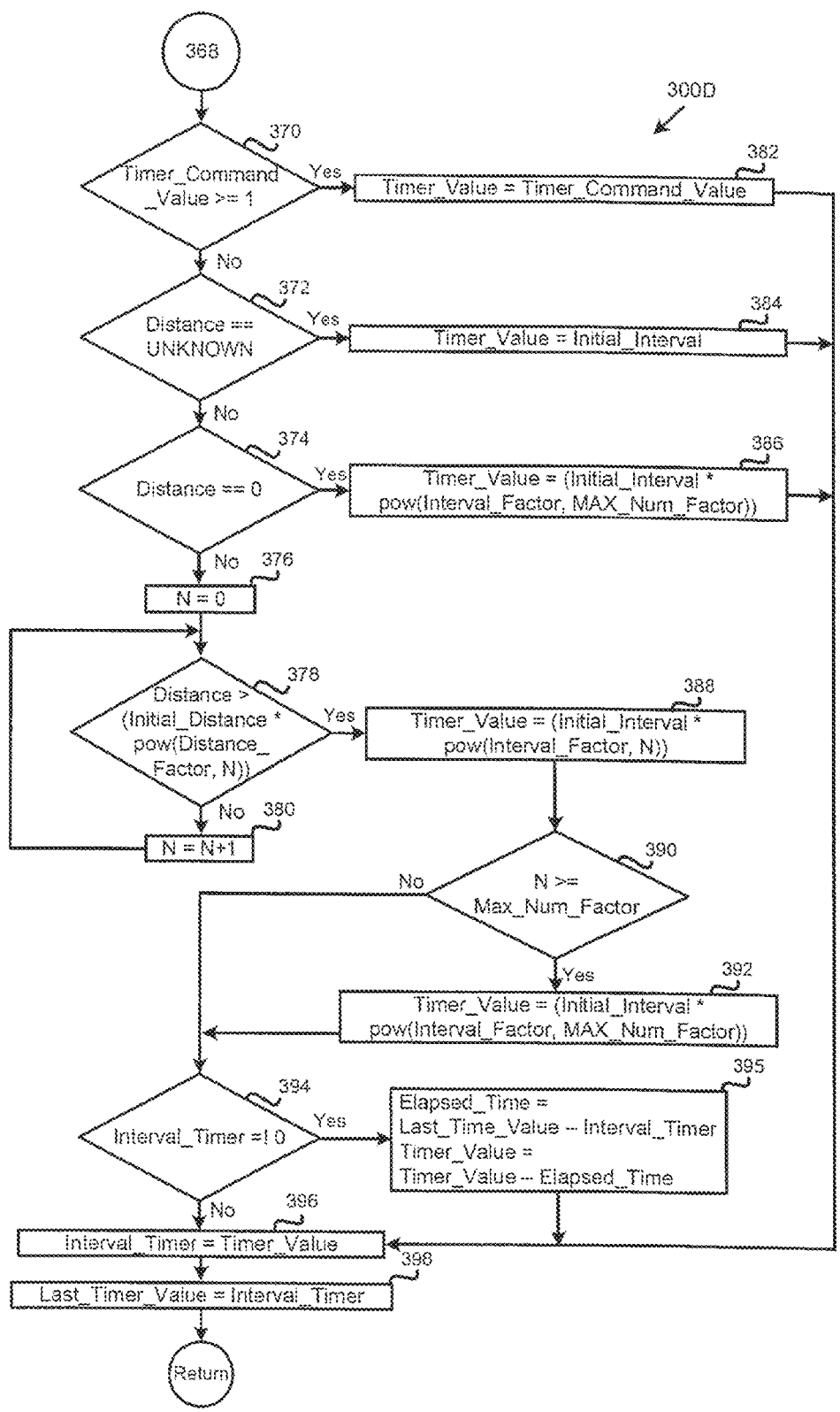
FIG. 3D illustrates flowchart of a ranging method/process by a first UE for determining relative distance and direction from the first UE to a second UE when at least the first UE is within the network coverage, according to an example implementation of the present application.

The above algorithm for determining the time intervals is now described with reference to the flowchart 300D in FIG. 3D. As shown in the figure, in action 370, the method may determine whether a timer command parameter is received from the cell having a value greater than or equal to 1. If the method determines that a timer command parameter has been received (e.g., from the cell) and it has a value of 1 or greater than one, the method may set, in action 382, the timer value as the timer command value and proceed to operation 396. If the method determines that no such parameter is received, or the parameter is received, but its value is less than 1 (e.g., zero), the method may proceed to operation 372, in which the method may determine whether the distance in unknown.

If the process determines that the distance is unknown, or the distance is greater than a threshold, the method may set, in action 384, the timer value as the default or initial interval value and proceed to operation 396. If the method determines that the distance is not unknown, nor is it greater than a threshold, the method may determine, at operation 374, whether the distance is zero or less than a minimum threshold. If the process determines that the distance is zero or less than a minimum threshold, the process may set the timer value as the initial interval multiplied by the interval factor to the power of maximum number factor. The process may then proceed to operation 396, which is described below.

If the process determines that the distance is not zero and greater than the minimum threshold (but less than the maximum threshold), the process may iteratively determine, at operation 378, whether the current distance is greater than the initial distance multiplied by the interval factor to the power of the number N (e.g., N being an integer). The number of iterations may be determined by setting, at operation 376, the number N to zero, and incrementing it, in operation 380, by one until the process determines that the current distance is less than or equal to the initial distance multiplied by the interval factor to the power of the number N.

When the process determines, in action 378, that the current distance is less than or equal to the initial distance multiplied by the interval factor to the power of the number N, the process may proceed to action 388 to set the timer value to the initial distance multiplied by the interval factor to the power of the number N. The process may then determine, in action 390, whether the number N is greater than or equal to the maximum number factor. If the process determines that the number N is less than the maximum number factor, the process may proceed to operation 394, which is described below. On the other hand, if the process determines that the number N is greater than or equal to the maximum number factor, the process may set, in operation 392, the timer value to the initial distance multiplied by the interval factor to the power of the maximum number factor.

In operation 394, the process may determine whether the interval timer is not zero. If the process determines that the interval timer is zero the process may proceed to operation 396, otherwise, the process may set, in operation 395 and before proceeding to operation 396, the elapsed time to last interval value minus current interval timer and also may set the timer value to the timer value minus the calculated elapsed time.

In operation 396, the process may set the interval timer to the timer value. Next, in operation 398, the process may set the last timer value to the interval timer and proceed to operation 364, as described above with reference to flowchart 300C shown in FIG. 3C.

With reference to the flowchart 300C in FIG. 3C, the following description includes an example process in which an initial directional determination operation is followed by an additional iteration of the directional determination operation by the first UE in determining a direction from the first UE to the second UE. In the below described example, the focus is more on the directional determination operations and not the distance determination operations and/or time interval determination operations. It should be noted, however, that a ranging process may include all of these three operations for determining the distance and direction between a first UE and a second UE, as well as the periodicity of performing the distance and direction determination operations.

In action 348, the first UE establishes a first SL connection from the first UE to the second UE using a first resource set, the first resource set being the initial Direction resource set provided by an NR V2X Control Function. The first resource set includes an identifier (ID) of the first resource set, parameters for configuring a first V2X Resource Pool, and Beam Management (BM) parameters associated with the first V2X Resource Pool for enabling a first set of directional transmission beams.

In action 352, the first UE determines a first beam of the first set of directional transmission beams the second UE has chosen to establish the first SL connection. The first UE may identify the first beam by an index of the first beam. For example, the first beam index identifies the first beam of the first set of directional transmission beams the second UE has chosen to establish the first SL connection.

In action 354, the first UE receives, from the second UE, a QoS value associated with the first beam of the first set of directional transmission beams used for establishing the first SL connection. In one implementation, the QoS value associated with the first beam is provided by the another UE to the UE via a PC5 Radio Resource Control (RRC) message MeasurementReportSidelink.

In action 356, the first UE reports, to the NR V2X Control Function, the 3-Tuple having the ID of the first resource set, the first beam index identifying the first beam, and the QoS value associated with the first beam. The first UE may also provide, to the NR V2X Control Function, a first indication that the first UE is capable of a ranging function using an SL channel in combination with a BM process, the ranging function resolving a direction and an inclination from the first UE to the second UE. The first indication includes a maximum number of array elements of each antenna used by the first UE, a frequency range of each antenna used by the first UE, and a number of antennas used by the first UE.

The NR V2X Control Function makes a ranging direction determination from the first UE to the second UE based on the first indication from the first UE, the QoS value associated with the first beam, the first beam index, and the ID of the first resource set. For example, during the ranging direction determination, the NR V2X Control Function determines whether the first beam is an optimal beam for SL communication from the first UE to the second UE.

For example, the NR V2X Control Function determines that the first beam is not the optimal beam for SL communication from the first UE to the second UE, when it is determined that further beam refinement may improve the SL communication from the first UE to the second UE. Otherwise, the NR V2X Control Function may provide a Direction Result to the first UE to terminate the directional determination operations.

When the NR V2X Control Function determines that the first beam is not the optimal beam for SL communication from the first UE to the second UE, the NR V2X Control Function configures a second resource set to the first UE (e.g., in action 362) to establish a second SL connection the first UE to the second UE. The second resource set include an ID of the second resource set, parameters for configuring a second V2X Resource Pool, and BM parameters associated with the second V2X Resource Pool for enabling a second set of directional transmission beams. The first UE then establishes the second SL connection from the first UE to the second UE (e.g., in action 351) using the second resource set.

In action 353, the first UE determines a second beam of the second set of directional transmission beams the second UE has chosen to establish the second SL connection. The first UE may identify the second beam by an index of the second beam. For example, the second beam index identifies the second beam of the second set of directional transmission beams the second UE has chosen to establish the second SL connection.

In action 354, the first UE receives, from the second UE, a QoS value associated with the second beam of the second set of directional transmission beams used for establishing the second SL connection. In one implementation, the QoS value associated with the second beam is provided by the second UE to the first UE via a PC5 Radio Resource Control (RRC) message MeasurementReportSidelink.

In action 356, the first UE reports, to the NR V2X Control Function, the 3-Tuple having the ID of the second resource set, the second beam index identifying the second beam, and the QoS value associated with the second beam. The first UE may also provide, to the NR V2X Control Function, a second indication that the first UE is capable of a ranging function using an SL channel in combination with a BM process, the ranging function resolving a direction and an inclination from the first UE to the second UE. The second indication includes a maximum number of array elements of each antenna used by the first UE, a frequency range of each antenna used by the first UE, and a number of antennas used by the first UE.

The NR V2X Control Function makes a second ranging direction determination from the first UE to the second UE based on the second indication from the first UE, the QoS value associated with the second beam, the second beam index, and the ID of the second resource set. For example, during the second ranging direction determination, the NR V2X Control Function determines whether the second beam is an optimal beam for SL communication from the first UE to the second UE.

When the NR V2X Control Function determines that the second beam is not the optimal beam for SL communication from the first UE to the second UE, the NR V2X Control Function may configure a third resource set to the first UE to establish a third SL connection from the first UE to the second UE for another iteration of actions in the flowchart 300C. Otherwise, the NR V2X Control Function may provide a Direction Result to the first UE to terminate the directional determination operations.

FIG. 7 illustrates an example of a new NR SIB12 in accordance with an implementation of the present disclosure.

FIG. 8 illustrates an example of a new RRC Reconfiguration (RRCReconfiguration) message in accordance with an implementation of the present disclosure.

FIG. 9 illustrates an example of a new Sidelink UE Information NR (SidelinkUEInformationNR) message in accordance with an implementation of the present disclosure.

The following example describes what the NR V2X UE may do upon reception of an NR SIB12 with a new IE sl-DirectionConfigCommonNR-r17, as an addition to the existing text in the 3GPP TS 38.331.

Upon receiving SIB12, the UE shall:
1> if the UE has stored at least one segment of SIB12 and the value tag of SIB12 has changed since a previous segment was stored:
   2> discard all stored segments;
1> store the segment;
1> if all segments have been received:
   2> assemble SIB12-IEs from the received segments;
   2> if sl-FreqInfoList is included in sl-ConfigCommonNR:
      3> if configured to receive NR sidelink communication:
         4> use the resource pool(s) indicated by sl-RxPool for NR sidelink communication reception, as specified in 5.8.7;
      3> if configured to transmit NR sidelink communication:
         4> use the resource pool(s) indicated by sl-TxPoolSelectedNormal, or sl-TxPoolExceptional for NR sidelink communication transmission, as specified in 5.8.8;
         4> perform CBR measurement on the transmission resource pool(s) indicated by sl-TxPoolSelectedNormal and sl-TxPoolExceptional for NR sidelink communication transmission, as specified in 5.5.3.1;
      34> use the synchronization configuration parameters for NR sidelink communication on frequencies included in sl-FreqInfoList, as specified in 5.8.5;
   2> if sl-RadioBearerConfigList or sl-RLC-BearerConfigList is included in sl-ConfigCommonNR:
      3> perform sidelink DRB reconfiguration as specified in 5.8.9.1a;
   2> if sl-MeasConfigCommon is included in sl-ConfigCommonNR:
      3> store the NR sidelink measurement configuration.
   2> if sl-Direction-Not-Allowed is set FALSE in SIB12-IEs-r16
      3> if sl-DirectionConfigCommonNR-r17 is included in SIB12-IEs-r16:
         4> if sl-FreqInfoList is included in sl-ConfigCommonNR-r16 in sl-DirectionConfigCommonNR-r17:

5> if configured to transmit NR sidelink communication:
      5> store the IE sl-DirectionConfigCommonNR-r17 (e.g., for later use by the SL Direction Determination Method).

The following example describes what the NR V2X UE may do upon reception of a NR RRCReconfiguration message with a new IE sl-DirectionConfigCommonNR-r17, as an addition to the existing text in the 3GPP TS38.331.

The UE shall perform the following actions upon reception of the RRCReconfiguration, or upon execution of the conditional reconfiguration (CHO or CPC):

1> if the RRCReconfiguration is applied due to a conditional reconfiguration execution upon cell selection while timer T311 is running, as defined in 5.3.7.3:
    2> remove all the entries within VarConditionalReconfig, if any;
    [ . . . ]
  1> if sl-DirectionConfigDedicatedNR-r17 is included in RRCReconfiguration:
    2> if sl-FreqInfoList is included in sl-ConfigCommonNR-r16 in sl-DirectionConfigDedicatedNR-r17:
      3> if configured to transmit NR sidelink communication:
        4> use the resource pool(s) indicated by sl-TxPoolSelectedNormal, or sl-TxPoolExceptional for NR sidelink communication transmission, as specified in 5.8.8;
        4> perform CBR measurement on the transmission resource pool(s) indicated by sl-TxPoolSelectedNormal and sl-TxPoolExceptional for NR sidelink communication transmission, as specified in 5.5.3.1;
        4> use the synchronization configuration parameters for NR sidelink communication on frequencies included in sl-FreqInfoList, as specified in 5.8.5;
        4> store the IE sl-DirectionConfigDedicatedNR-r17 (e.g., for late use by the interval aspects of the SL Direction Determination Method);

[ . . . ]

The following example describes what the NR V2X UE may do upon preparing to transmit the SidelinkUEInformationNR message with a new IE UE-TxAntennaParamList-R17, and SL-DirDetrminationResult-r17 as an addition to the existing text in the 3GPP TS38.331.

The UE shall set the contents of the SidelinkUEInformationNR message as follows:

1> if the UE initiates the procedure to indicate it is (no more) interested to receive NR sidelink communication or to request (configuration/release) of NR sidelink communication transmission resources or to report to the network that a sidelink radio link failure or sidelink RRC reconfiguration failure has been declared (i.e., UE includes all concerned information, irrespective of what triggered the procedure):
    2> if SIB12 including sl-ConfigCommonNR is provided by the PCell:
      3> if configured by upper layers to receive NR sidelink communication:
        4> include sl-RxInterestedFreqList and set it to the frequency for NR sidelink communication reception;
      3> if configured by upper layers to transmit NR sidelink communication:
        4> include UE-TxAntennaParamList-R17 and set its fields (if needed)
        4> include SL-DirDetrminationResult-r17 and set its fields (if needed)
[ . . . ]

In various implementations of the present disclosure, the new information elements SL-DirConfigCommon-r17 are carried by an SIB12. Those information elements are generated by the network's NR V2X Control Function. The new information elements in the SIB12 may include a single set of the following resource configuration data:
  Parameters for configuring a NR V2X Resource Pool;
  Beam Management parameters associated NR V2X Resource Pool;
  A unique ID associated with the set of NR V2X Resource Pool and Beam Management parameters and QoS threshold, which is always set to 1.

In various implementations of the present disclosure, the new information elements SL-DirConfigDedicated-r17 are carried by an RRCReconfiguration message. Those information elements are generated by the network's NR V2X Control Function. The new information elements RRCReconfiguration may include multiple sets of the following resource configuration data:
  Parameters for configuring a NR V2X Resource Pool;
  Beam Management parameters associated NR V2X Resource Pool;
  A unique ID associated with the set of NR V2X Resource Pool and Beam Management parameters and QoS threshold, which is between 2 and the maximum number of resource configuration sets, and thus does not re-use the identification of the resource set provided by SIB12.

In various implementations of the present disclosure, a new mechanism takes as input from the network's NR V2X Control Function a plurality of resource sets that provides for the configuration of the physical layer SL channel, where each resource set contains at least: a unique identifier for the resource set, parameters for configuring a NR V2X Resource Pool, parameters enabling a specific set of directional Tx beams.

In various implementations of the present disclosure, a Rel-17 NR UE includes a new mechanism that provides as input to the network's NR V2X Control Function an indication that the UE is capable of a Ranging function using the Sidelink channel in combination with a Beam Management process. The input to the NR V2X Control Function may include the maximum number of array elements of each antenna used by the UE and the frequency range of each antenna used by the UE and the number of antennas used by the UE.

In various implementations of the present disclosure, a Rel-17 NR UE includes a new mechanism that is capable of providing to the V2X resource selection function a resource set.

In various implementations of the present disclosure, a Rel-17 NR UE includes a new operation that is capable of receiving from the network's NR V2X Control Function a resource set to enhance the V2X resource selection capabilities of the Rel-17 NR UE.

In various implementations of the present disclosure, a Rel-17 NR UE includes a new operation that is capable of configuring the physical layer of the Rel-17 NR UE to use a specific resource set for the purpose of establishing an SL communications channel with another Rel-17 NR UE, for the further purpose of determining the direction from the two UEs.

In various implementations of the present disclosure, a Rel-17 NR UE includes a new operation that is capable of forwarding to the network's NR V2X Control Function an indication of which beam was chosen by another Rel-17 NR UE to establish a connection to the Rel-17 NR UE via the SL communications channel.

In various implementations of the present disclosure, a Rel-17 NR UE includes a new mechanism that can map the indication of which beam was chosen by another Rel-17 NR UE to establish an SL connection to the Rel-17 NR UE, to a beam index of the resource set.

In various implementations of the present disclosure, a Rel-17 NR UE includes a new operation that is capable of forwarding to the network's NR V2X Control Function a report regarding the QoS of the beam chosen by another Rel-17 NR UE to establish an SL connection to the Rel-17 NR UE.

In various implementations of the present disclosure, a Rel-17 NR UE includes a new mechanism that provides as input to the network's NR V2X Control Function the results of a ranging operation which may include: the beam selected to establish the SL connection, the resource set used to establish the SL connection, and a QoS value of the establish SL connection via a 3-Tuple of [Resource set unique ID, Beam Index, QoS].

What is claimed is:

1. A first user equipment (UE) for sidelink communication with a second UE, the first UE comprising:
    one or more non-transitory computer-readable media having computer-executable instructions embodied thereon; and
    at least one processor coupled to the one or more non-transitory computer-readable media, and configured to execute the computer-executable instructions to:
    receive, at the first UE, a first resource set from a cell to establish a first sidelink channel with the second UE, the first resource set indicating at least a first distance between the first UE and the second UE;
    establish the first sidelink channel with the second UE based on the first resource set;
    transmit a set of parameters associated with the established first sidelink channel to the cell;
    set a first timer based on at least the first distance indicated in the first resource set, the first timer for determining when to establish a second sidelink channel with the second UE; and
    when the first timer is expired and no second resource set is received from the cell, establish the second sidelink channel with the second UE based on the first resource set.

2. The first UE of claim 1, wherein the at least one processor is further configured to execute the computer-executable instructions to:
    before the first timer is expired, receive the second resource set from the cell;
    determine whether the second resource set indicates at least a second distance between the first and second UEs; and
    when the second resource set indicates the second distance:
    set a second timer based on at least the second distance indicated in the second resource set;
    determine that the second timer is shorter than the first timer; and
    when the second timer is expired, and before the first timer is expired, establish the second sidelink channel with the second UE based on the second resource set.

3. The first UE of claim 2, wherein the at least one processor is further configured to execute the computer-executable instructions to, when the second resource set does not indicate the second distance:
    determine whether the second resource set comprises at least a parameter that indicates an overriding timer for establishing the second sidelink channel with the second UE; and
    when the second resource set includes the parameter, establish the second sidelink channel with the second UE based on the second resource set after the overriding timer is expired irrespective of the overriding timer is shorter or longer than the first timer.

4. The first UE of claim 3, wherein the at least one processor is further configured to execute the computer-executable instructions to, when the second resource set does not include the parameter:
    establish the second sidelink channel with the second UE based on the second resource set after the first timer is expired.

5. The first UE of claim 2, wherein the first resource set further indicates a first direction to the second UE and the second resource set further indicates a second direction to the second UE.

6. The first UE of claim 5, wherein the second distance is shorter than the first distance while the second direction is the same or different than the first direction.

7. The first UE of claim 1, wherein receiving the first resource set from the cell comprises receiving the first resource set from a new radio (NR) vehicle to everything (V2X) control function associated with the cell.

8. The first UE of claim 1, wherein:
    setting the first timer based on at least the first distance comprises calculating a time interval between each two sequential establishments of sidelink channels; and
    the time interval is calculated based on one or more parameters.

9. The first UE of claim 8, wherein the one or more parameters comprises at least one of an initial time interval, an interval factor, an initial distance, a distance factor, and a maximum number of iterations in calculating the time interval.

10. The first UE of claim 8, wherein the one or more parameters are included in at least one resource set in the plurality of resource sets including the first and second resource sets.

11. The first UE of claim 1, wherein setting the first timer based on at least the first distance comprises:
    when the first distance is more than a first threshold or the first distance is unknown, setting the timer to a default time interval;
    when the first distance is less than a second threshold, setting the timer to a minimum time interval which is calculated based on the default time interval; and
    when the first distance is between the first and second thresholds, setting the timer to a value that is calculated based on at least one of the default time interval, an interval factor, a default distance, and a distance factor.

12. The first UE of claim 1, wherein the first resource set comprises an identifier (ID) of the first resource set, parameters for configuring a first sidelink resource pool, and beam management (BM) parameters associated with the first sidelink resource pool for enabling a first set of directional transmission beams.

13. The first UE of claim 12, wherein the first sidelink resource pool comprises a V2X resource pool.

14. The first UE of claim 1, wherein the at least one processor is further configured to execute the computer-executable instructions to:

before receiving the first resource set from the cell, send a message to the cell requesting the first resource set via dedicated signaling.

15. The first UE of claim 1, wherein the at least one processor is further configured to execute the computer-executable instructions to:
    before receiving the first resource set from the cell to establish the first sidelink channel with the second UE, receive, from the cell, an initial sidelink configuration to establish an initial sidelink channel with the second UE, the initial configuration indicating at least a default timer;
    establish the initial sidelink channel with the second UE based on the initial sidelink configuration;
    transmit an initial set of parameters associated with the established initial sidelink channel to the cell, wherein the cell determines the first distance based on the received initial set of parameters; and
    set an initial timer based on at least the default timer indicated in the initial sidelink configuration, the initial timer for determining when to establish the first sidelink channel with the second UE.

\* \* \* \* \*